United States Patent [19]

Johnson, Jr.

[11] Patent Number: 4,479,750

[45] Date of Patent: Oct. 30, 1984

[54] APPARATUS FOR LOADING AND UNLOADING RAILWAY CARS

[76] Inventor: Ted C. Johnson, Jr., 33829 Country View La., Chagrin Valley Estates, Solon, Ohio 44139

[21] Appl. No.: 380,034

[22] Filed: May 20, 1982

Related U.S. Application Data

[63] Continuation-in-part of Ser. No. 124,838, Feb. 26, 1980, abandoned.

[51] Int. Cl.$^3$ .................. B65G 67/02; B60S 9/02; B66F 7/26
[52] U.S. Cl. .................. 414/392; 414/339; 414/399; 280/765.1; 254/45
[58] Field of Search ............ 414/339, 391, 392, 394, 414/399, 498, 572; 254/45, 49, 50; 294/88, 106; 212/182–185, 189; 280/765.1, 766.1; 104/5, 6, 126

[56] References Cited

U.S. PATENT DOCUMENTS

| | | | |
|---|---|---|---|
| 558,376 | 4/1896 | Fletcher | 211/17 |
| 588,277 | 8/1897 | Kilgore | 212/189 |
| 890,157 | 6/1908 | Miller et al. | 414/392 |
| 890,158 | 6/1908 | Miller et al. | 414/392 |
| 1,231,462 | 6/1917 | Tutwiler | 212/158 |
| 1,241,830 | 10/1917 | Dickinson et al. | 212/189 |
| 1,505,103 | 8/1924 | Miller | 212/189 |
| 1,905,434 | 4/1933 | Boyer | 212/182 X |
| 2,172,244 | 9/1939 | Grundler | 254/45 |
| 3,151,751 | 10/1964 | Marini | 414/572 |
| 3,180,601 | 4/1965 | Belt | 248/151 |
| 3,332,661 | 7/1967 | Hand | 254/86 |
| 3,520,433 | 7/1970 | Blackburn | 414/498 |
| 3,570,689 | 3/1971 | Eaton | 414/572 |
| 3,679,174 | 7/1972 | Boettcher | 254/45 |
| 3,759,564 | 9/1973 | Seaberg | 294/88 |
| 4,067,595 | 1/1978 | Vigerie | 280/766.1 |
| 4,099,635 | 7/1978 | Leonard et al. | 414/339 X |

FOREIGN PATENT DOCUMENTS

| | | |
|---|---|---|
| 2645025 | 4/1978 | Fed. Rep. of Germany . |
| 1164669 | 9/1969 | United Kingdom . |
| 145322 | 5/1962 | U.S.S.R. . |

*Primary Examiner*—Robert J. Spar
*Assistant Examiner*—David A. Bucci
*Attorney, Agent, or Firm*—Body, Vickers & Daniels

[57] ABSTRACT

A crane is mounted on a platform having ground engaging legs adapted to support the platform in an elevated position straddling railroad tracks so that a railway car to be loaded or unloaded is adapted to be moved beneath the platform. The legs are adapted to be displaced between raised and lowered positions relative to the platform and are in the lowered positions thereof when the platform is so ground supported. When a railway car has been moved beneath the platform, the legs are displaced toward their raised positions whereby the platform is lowered onto the car to rest on the top edges of the side walls thereof. Preferably, the legs are also adapted to be displaced laterally between extended and retracted positions relative to the platform and are retracted when the platform rests on the car to minimize lateral projection of the apparatus relative to the car. Clamping arrangements are provided for releasably interengaging the platform and the side walls of the car when the platform is supported thereon, and the crane is operable with the platform supported on the car to achieve the loading and/or unloading thereof. The legs are also mounted on the platform for pivotal movement to horizontal positions parallel to the platform to facilitate transporting the apparatus on a flat bed railway car. A grapple assembly is provided for the crane which enables use of the apparatus to achieve a unique method of loading railway ties in a gondola car.

21 Claims, 27 Drawing Figures

FIG. 5

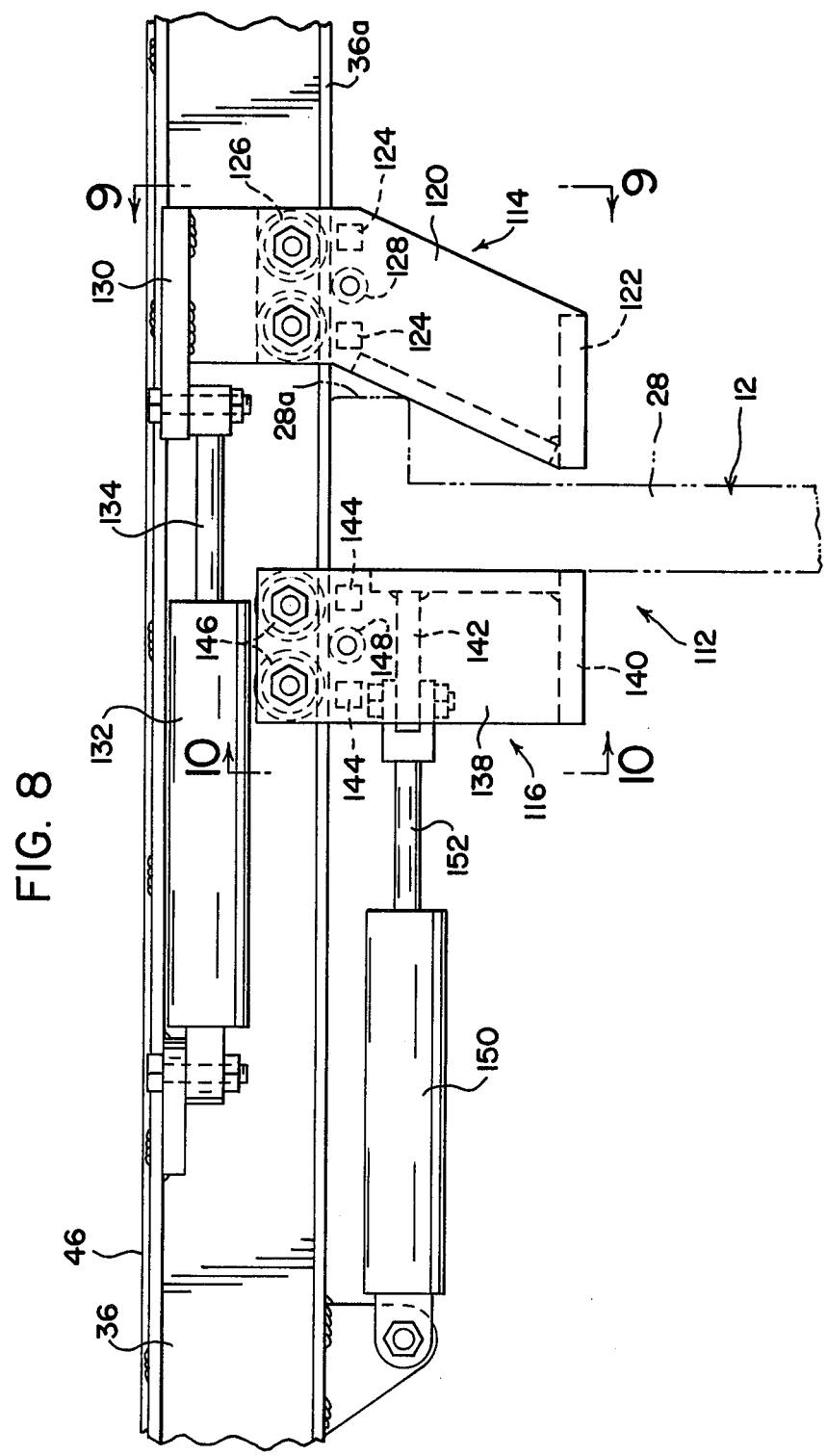

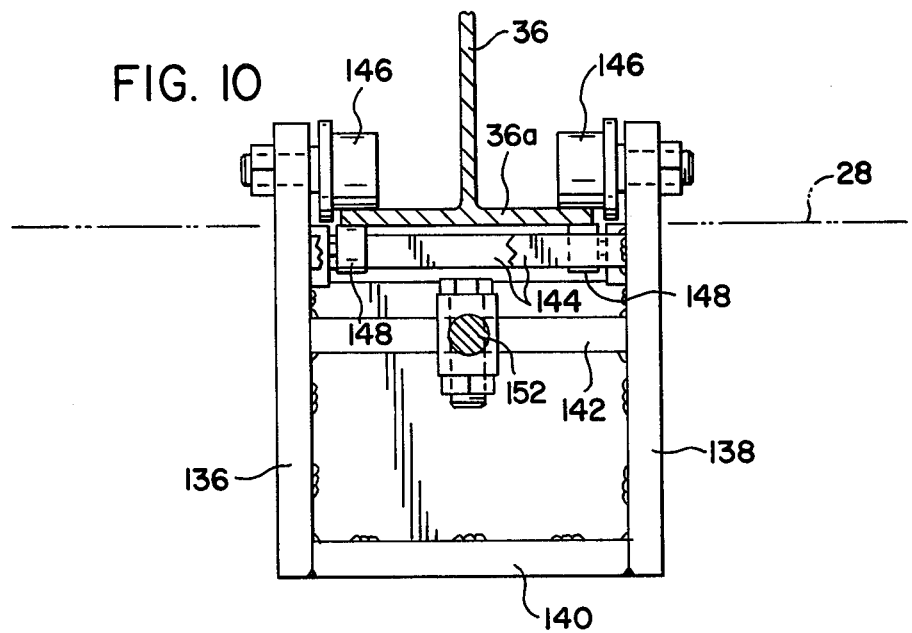
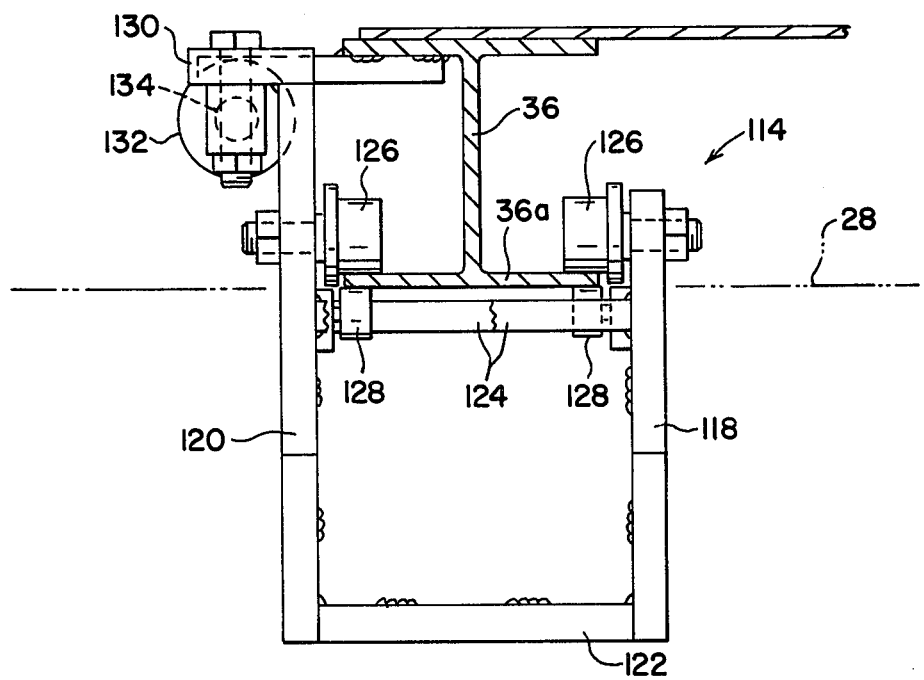

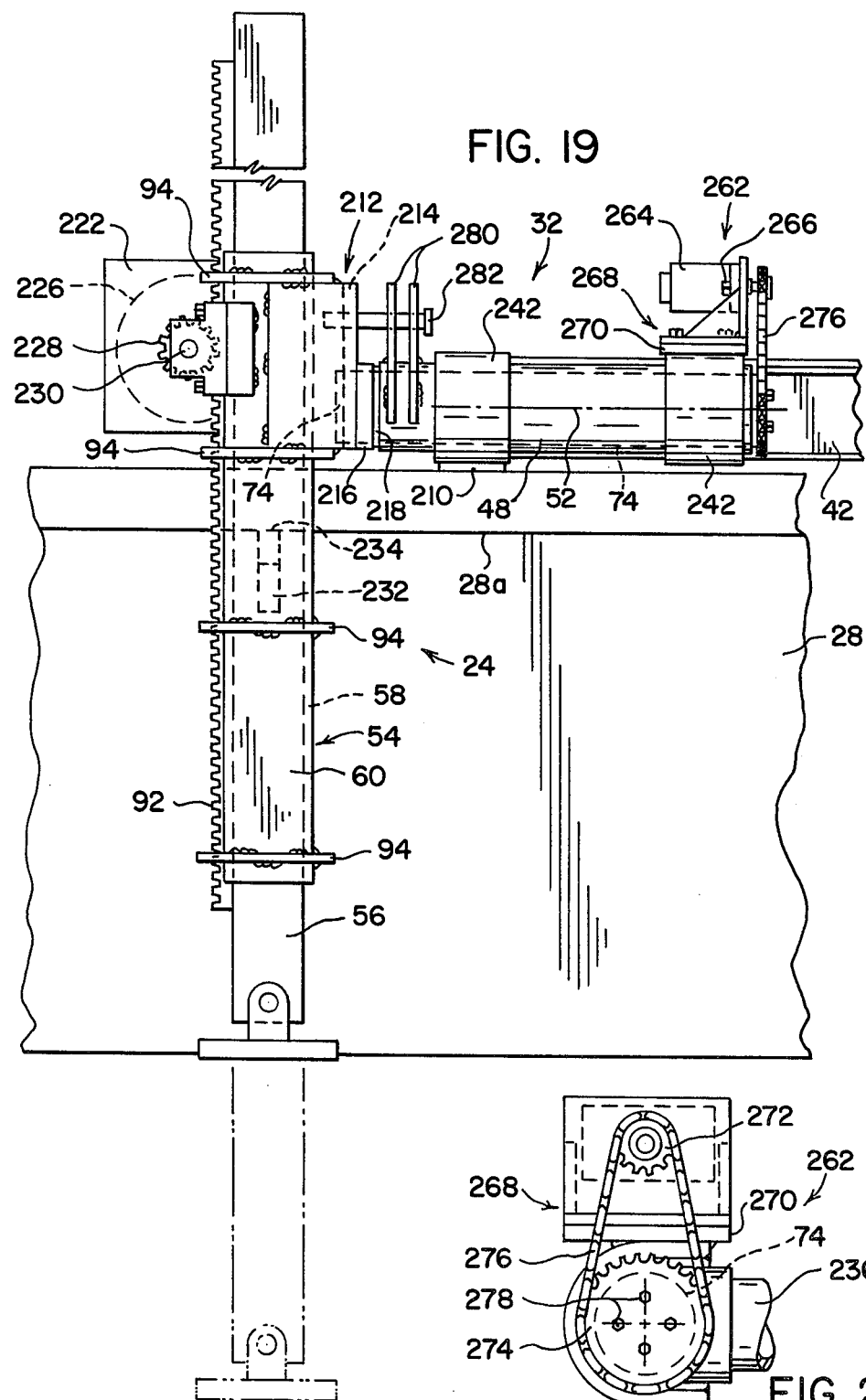

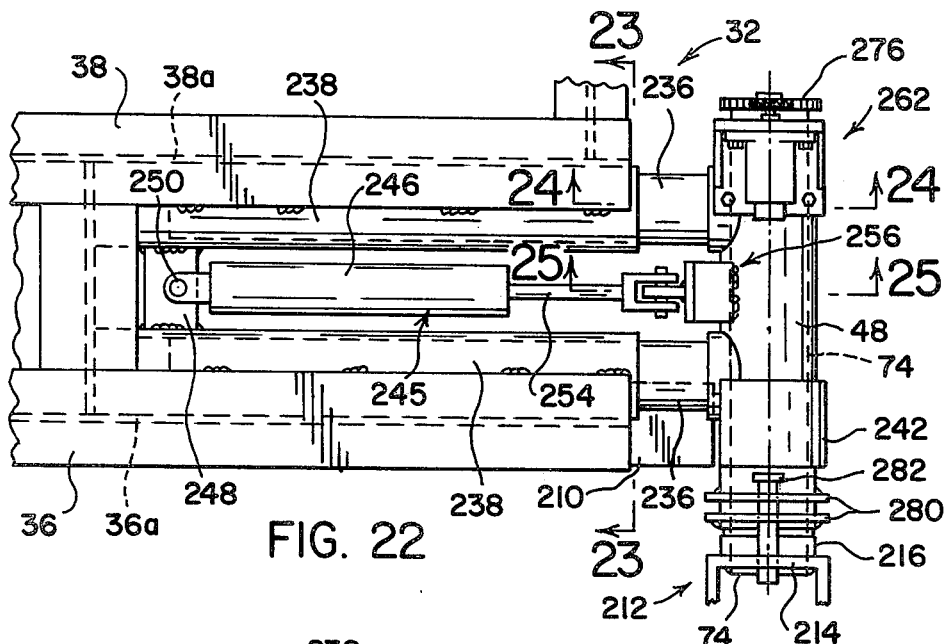
FIG. 22
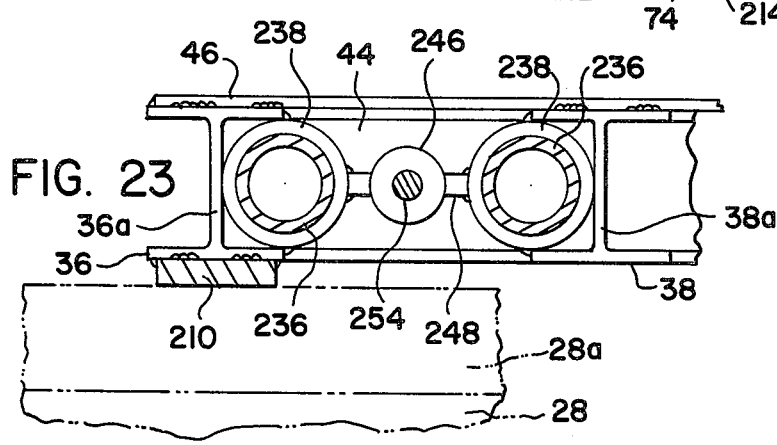
FIG. 23
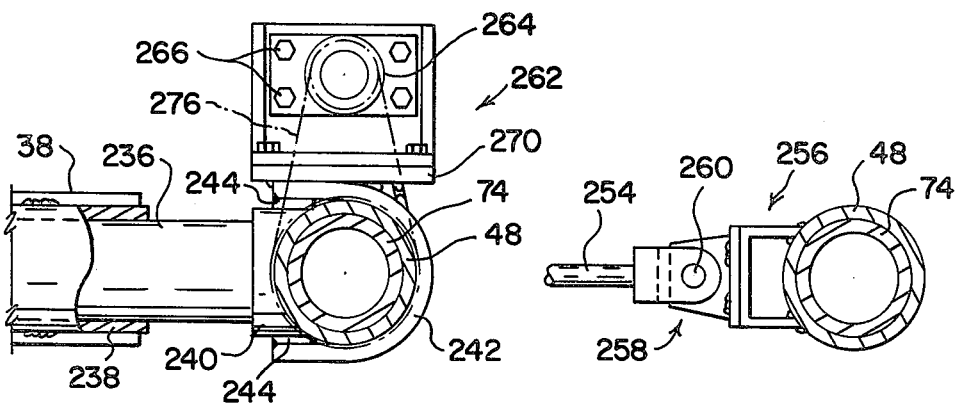
FIG. 24
FIG. 25

APPARATUS FOR LOADING AND UNLOADING RAILWAY CARS

BACKGROUND OF THE INVENTION

This application is a continuation-in-part of application Ser. No. 124,838 filed Feb. 26, 1980, now abandoned.

This invention relates to the art of railways and, more particularly, to apparatus for loading and unloading railway cars.

The present invention finds particular utility in connection with loading and/or unloading railway ties from a gondola type railway car and, accordingly, will be described in detail herein in connection with such use. At the same time, it will be appreciated that the apparatus can be used in connection with the loading and/or unloading of materials other than railway ties from such a railway car, and for the loading and/or unloading of materials from other types of railway cars.

It is of course well known to fill a gondola car with new railway ties and to distribute the ties at locations along railway tracks where tie replacement operations are to take place. It is likewise well known that gondola cars are subsequently loaded with the replaced ties for the latter to be transported to a location or locations for disposal. Car loading and unloading apparatus has been provided for the foregoing purpose, including apparatus adapted to be supported on the top edges of the side walls of a gondola car to be loaded or unloaded, or an adjacent car, and having boom operated grapple means for achieving the loading and unloading operations. When a given car has been filled with ties, or emptied, the apparatus is transferred to another car in readiness for the next filling or emptying operation.

There are many advantages attendant to loading and unloading railway cars with such car supported equipment, including the fact that a number of coupled cars can be sequentially loaded or unloaded and, during such operations, moved along the tracks with the apparatus thereon to locations where the new ties are to be unloaded, or replaced ties loaded into the cars. Such car supported apparatus heretofore provided, however, are structurally complex and limited in versatility of operation and, in some instances, are limited with respect to the gondola cars with which the apparatus can be used and/or the condition of the cars. In this respect, for example, such apparatus has been provided with wheels or rollers engaging the top edges of the side walls of a gondola car to support the apparatus relative thereto. The wheel arrangements enable the apparatus to move along the car and from one car onto the top edges of the side walls of an adjacent car. Apparatus of this character, however, is limited with respect to variations in height and width between adjacent gondola cars, thus necessitating the use of cars within such limitations. Accordingly, a somewhat special group of gondola cars must be maintained for use with the apparatus in that those cars which might otherwise be available for a loading or unloading operation could not be negotiated by the apparatus. Additionally, the rolling of the apparatus along the top edges of the side walls of the gondola cars requires that both the walls and the top edges thereof be in good condition to facilitate rolling of the apparatus therealong and to assure adequate support for the apparatus. This too limits the gondola cars with which such apparatus can be used. The necessity of having to maintain a special group of cars for tie loading and unloading apparatus in effect eliminates the availability of the gondola cars for other uses. When it is considered that gondola cars are high demand cars in the railroad business, it will be appreciated that such restrictions on the use thereof are extremely undesirable. Still further, the construction of such apparatus to provide for the wheels or rollers to be manipulatable to enable movement of the apparatus from one car to another is relatively complex, whereby the apparatus is expensive to manufacture.

Another device heretofore provided for loading and unloading gondola cars while resting on the top edges of the side walls thereof employs a pair of beams extending longitudinally of the railway car and along which a crane carriage is movable. Both the beams and the carriage are adapted to be supported on the top edges of the side walls of the car in a manner which enables the carriage to support the beams for displacement thereof relative to the carriage, and for the beams to support the carriage for movement therealong. Such support functions are alternated in operation to achieve movement of the apparatus along a car and across the space between adjacent cars. While apparatus of this character is more versatile than wheel supported apparatus with respect to use with gondola cars having different height and width dimensions, it is structurally complex, heavy and expensive to manufacture.

Still further, apparatus heretofore provided for loading and unloading gondola cars while resting on the top edges of the side walls thereof are limited either with respect to the height to which the gondola car can be filled with ties, or the direction of movement of the apparatus relative to the cars being loaded or unloaded. In this respect, if a given car is loaded with ties to a height above the side walls of the car, such material height will interfere with movement of the apparatus along the car, whereby loading or unloading must progress with respect to one direction of relative movement between the apparatus and cars. If the versatility of moving along a car in either direction is desired, then the height of loading must be less than would otherwise be possible, thus reducing the potential load capacity for a given string of cars. Further, should it be desired to keep the apparatus in a given location following a loading or unloading operation, either one car of the string must be left behind to support the apparatus, or the apparatus must be removed from the string of cars to a position alongside the railway tracks. The latter undesirably requires special handling equipment, and to leave one car behind undesirably reduces the load capacity otherwise available for the string of cars. Still further, when it becomes desirable to transport the apparatus from one location to another, such transportation with the apparatus on the gondola car is undesirable from the standpoint of stability, and may be impossible because of the overall height of the car and apparatus. While the latter problems can be avoided by transporting the apparatus such as on a flat car, for example, transfer of the apparatus from a gondola car to such a flat car requires special equipment for lifting the apparatus from the gondola car and lowering the apparatus onto the flat car, which equipment must of course be available or made available. All of these disadvantages adversely affect the cost and efficiency of railway tie handling operations, or any other car loading or unloading operations using such equipment.

Important too in connection with the operation of such railway car loading and unloading apparatus is stability thereof relative to the railway car enabling the unloading and loading thereof to and from locations a considerable distance from the axis of the crane, and clearances laterally of the car required by present day railroad standards both during use and transportation of the apparatus. Thus, while it has been proposed as shown in U.S. Pat. No. 588,277 to Kilgore to load and unload railway cars by means of a crane on a platform supported above an underlying car by ground engaging legs, such a ground supported construction is unstable with respect to lifting or lowering of loads. Moreover, the supporting legs and platform, both during use of the apparatus and transportation thereof, project laterally outwardly of the underlying railway car providing potential obstruction to movement of railway equipment or the like along adjacent railway tracks, which is neither desirable nor acceptable in accordance with modern day railroad regulations.

SUMMARY OF THE INVENTION

In accordance with the present invention, railway car loading and unloading apparatus is provided which is of the character adapted to be supported on the railway car during material loading and unloading operations and which, advantageously, is adapted to be self-supporting relative to ground and above the railway cars to enable movement of the cars therebeneath and relative thereto. More particularly, the apparatus basically includes a platform supporting a crane by which loading and unloading of the car is achieved and which platform is adapted to rest on an underlying railway car during the performance of loading and unloading operations by the crane. Further in accordance with the present invention, the platform is provided with legs displaceable between raised and lowered positions relative to the platform and which legs are in the raised dispositions when the platform is supported on an underlying car. The legs are adapted to be displaced from the raised toward the lowered positions thereof to engage the ground on opposite sides of the railway car and elevate the platform and thus the crane to a position spaced above the top edges of the side walls of the car. Therefore, cars can be loaded to a height above the top edges of the side walls thereof, and thereafter moved in either direction relative to the apparatus. Such height of loading depends on the space available between the platform and car when the platform is elevated thereabove, and which available space is in turn determined by the length of the legs for elevating the platform above the car. In any event, the platform and legs straddle the railway tracks and cars thereon, whereby the apparatus is adapted to be used with all gondola cars independent of variations in the width and height thereof. Moreover, by providing for the apparatus to rest on the car only during loading and unloading operations and to be self-supporting during displacement of cars relative thereto, the condition of the side walls and top edges of the side walls of the cars is much less critical than that required in connection with apparatus which is rolled or stepped along the side edges. It will be appreciated too that the self-supporting capability of the apparatus advantageously enables the latter to be left at a given work location following the loading or unloading of a given string of cars should it be desirable to do so, and that this is achieved by the apparatus itself and does not require any special cranes or the like.

In accordance with one aspect of the invention, the legs are supported on the platform for displacement laterally outwardly and inwardly relative to the railway car when the platform rests thereon. This advantageously enables minimizing the lateral width of the apparatus during use and thus lateral projection thereof from the sides of the railway car by providing for the legs in the retracted position thereof to be juxtaposed with respect to the corresponding side of the car. Displacement of the legs from the retracted to the extended positions, followed by lowering of the legs to elevate the platform from the car, provides stability for the apparatus and the necessary lateral clearance for the car to then be moved beneath the apparatus. Preferably, the platform is clampingly interengaged with the railway car when it rests thereon, either through clamping arrangements on the platform or by interengaging of the legs with the sides of the car when the legs are in the retracted positions thereof. This assures stability of the apparatus during use thereof, especially with respect to picking up or lowering loads at a considerable distance from the axis of the crane.

In accordance with another aspect of the invention, the apparatus is advantageously adapted to be self-loading onto a flat car or the like for long distance transportation thereof. In this respect, a flat car is moved into position under the platform when the latter is supported relative to ground in an elevated position, and the legs are displaced relative to the platform for the latter to be lowered onto the bed of the car. The legs are then further elevated out of engagement with ground whereby the apparatus is supported on the flat car. In accordance with this aspect of the invention, the legs are mounted on the platform for pivotal movement from the generally vertical dispositions thereof to horizontal positions parallel to the plane of the platform, thus enabling a more compact disposition of the component parts of the apparatus during transportation, and better stability than would be the case if the legs remained in the vertical positions. In accordance with preferred embodiments of the apparatus, the legs are pivotal relative to the platform in directions laterally outwardly with respect to the sides of the car and, to minimize lateral projection of the legs when the apparatus is supported on a flat car for transportation, the latter is provided with a simple turntable enabling pivotal movement of the apparatus relative to the flat car for the legs to extend longitudinally thereof. When the apparatus has been transported on a flat car to a location of use, the apparatus is readily movable to a disposition in which the platform and legs straddle the railway track and underlying flat car. Thereafter, the platform is readily elevated to a position enabling movement of the flat car from beneath the platform and movement of a car to be loaded or unloaded into position thereunder. When the car to be loaded or unloaded is so positioned, the platform is lowered thereonto so as to be supported by the car during the loading or unloading thereof.

As mentioned above, the platform elevating capability of the apparatus enables loading of a car above the top edges of the side walls and, in accordance with another aspect of the present invention, the crane can be provided with a grapple operable to achieve loading of ties in a gondola car in a generally vertical disposition, as opposed to random dropping of the ties into the car or the filling of the cars in horizontal layers. For a given gondola car, such vertical stacking increases the quantity of ties which can be carried therein relative to such random or horizontal layering.

The basic construction of the platform and the displaceable leg arrangements enables a more economical production cost with respect to railway car loading and unloading apparatus of the character to which the invention is directed. Further, the self-supporting capability enabling movement of railway cars beneath the apparatus, and self-loading of the apparatus with respect to an underlying flat car, promotes versatility and efficiency with respect to use thereof, increased capacity with respect to ties or other materials to be loaded or unloaded with respect to a given car, and lower operating costs.

It is accordingly an outstanding object of the present invention to provide improved railway car loading and unloading apparatus of the character adapted to be supported on a railway car during loading and unloading operations.

Another object is the provision of apparatus of the foregoing character which is adapted to be self-supporting relative to the ground in an elevated position spanning railway cars to enable movement of the cars therebeneath.

Yet another object is the provision of apparatus of the foregoing character having improved versatility with regard to the height and width dimensions of railway cars adapted to be loaded and unloaded thereby as well as the structural condition of the cars.

A further object is the provision of apparatus of the foregoing character which is adapted to be self-loading with respect to an underlying railway car for purposes of transportation thereby from one location to another.

Still a further object is the provision of apparatus of the foregoing character including a crane supporting platform and legs displaceable relative thereto in generally vertical directions to achieve elevating and lowering of the platform relative to a railway car.

Still another object is the provision of apparatus of the foregoing character including a crane supporting platform and legs displaceable relative thereto laterally inwardly and outwardly with respect to an underlying railway car to enable minimizing lateral projection of the apparatus relative to the car during use.

Yet a further object is the provision of apparatus of the foregoing character which enables displacement of the legs to generally horizontal positions parallel to the platform to facilitate transportation of the apparatus from one location to another.

Still another object is the provision of apparatus of the foregoing character having improved clamping arrangements for releaseably clamping the apparatus on a railway car during loading and unloading operations.

Still a further object is the provision of an improved method of loading railway ties in an open top railway car, and apparatus for carrying out the method.

Yet another object is the provision of apparatus of the foregoing character which is economical to produce and which is more versatile and efficient in use than car supported loading and unloading apparatus heretofore provided, and which enables reduction in operating costs and with respect to railway car loading and unloading operations.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which:

FIG. 5 is a plan view of the platform and leg assembly of the apparatus;

FIG. 6A is a sectional elevation view taken along line 6A—6A in FIG. 6;

FIG. 8 is an end elevation view of the platform showing the assemblies for clamping the apparatus on a gondola car;

FIG. 9 is a cross-sectional elevation view of a clamping assembly taken along line 9—9 in FIG. 8;

FIG. 10 is a cross-sectional elevation view of a clamping assembly taken along line 10—10 in FIG. 8;

FIG. 19 is a side elevation view of the embodiment shown in FIG. 17 taken along line 19—19 in FIG. 17;

FIG. 20 is an elevation view taken along line 20—20 in FIG. 17 and showing the drive arrangement for pivoting the leg assemblies between vertical and horizontal positions;

FIG. 22 is an enlarged plan view showing the arrangement for supporting and displacing the leg assemblies laterally outwardly and inwardly relative to the platform;

FIG. 23 is a cross-sectional view taken along line 23—23 in FIG. 22;

FIG. 24 is a cross-sectional view taken along line 24—24 in FIG. 22;

FIG. 25 is a cross-sectional view taken along line 25—25 in FIG. 22; and,

DESCRIPTION OF PREFERRED EMBODIMENTS

Figure 1:
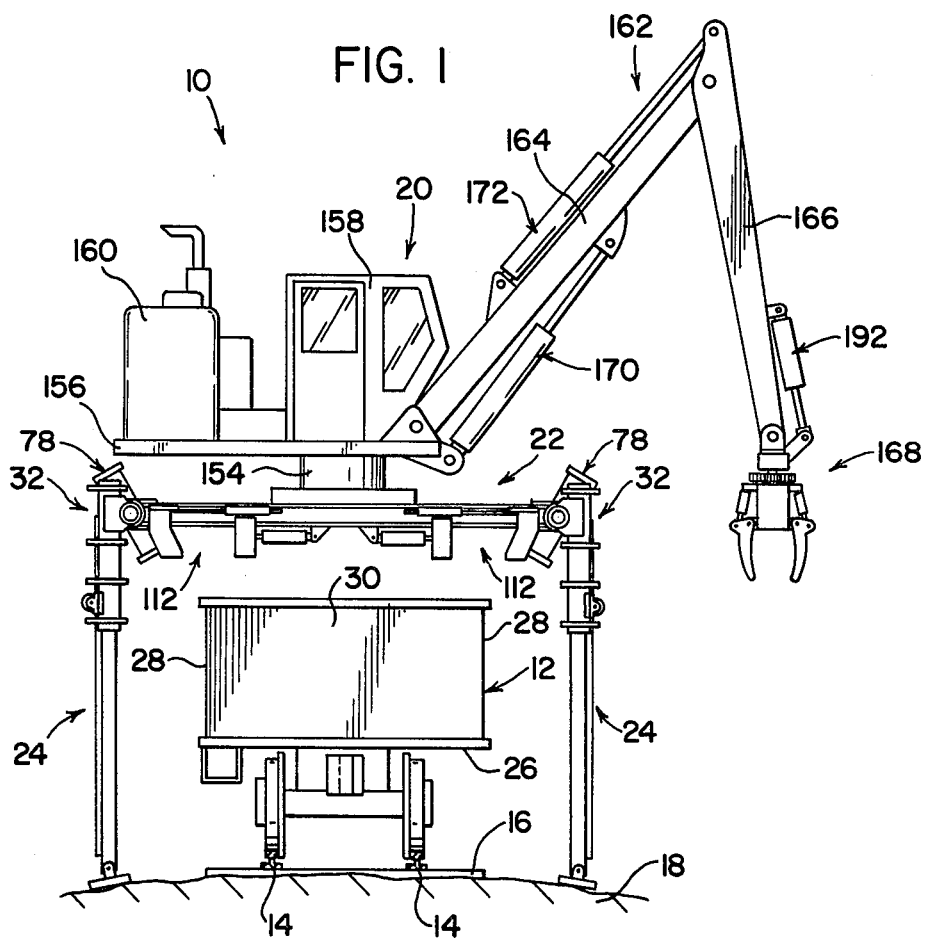
FIG. 1 is an end elevation of railway car loading and unloading apparatus according to the present invention showing the apparatus associated with a gondola car and with the platform of the apparatus elevated and ground supported relative to the car.
Figure 2:
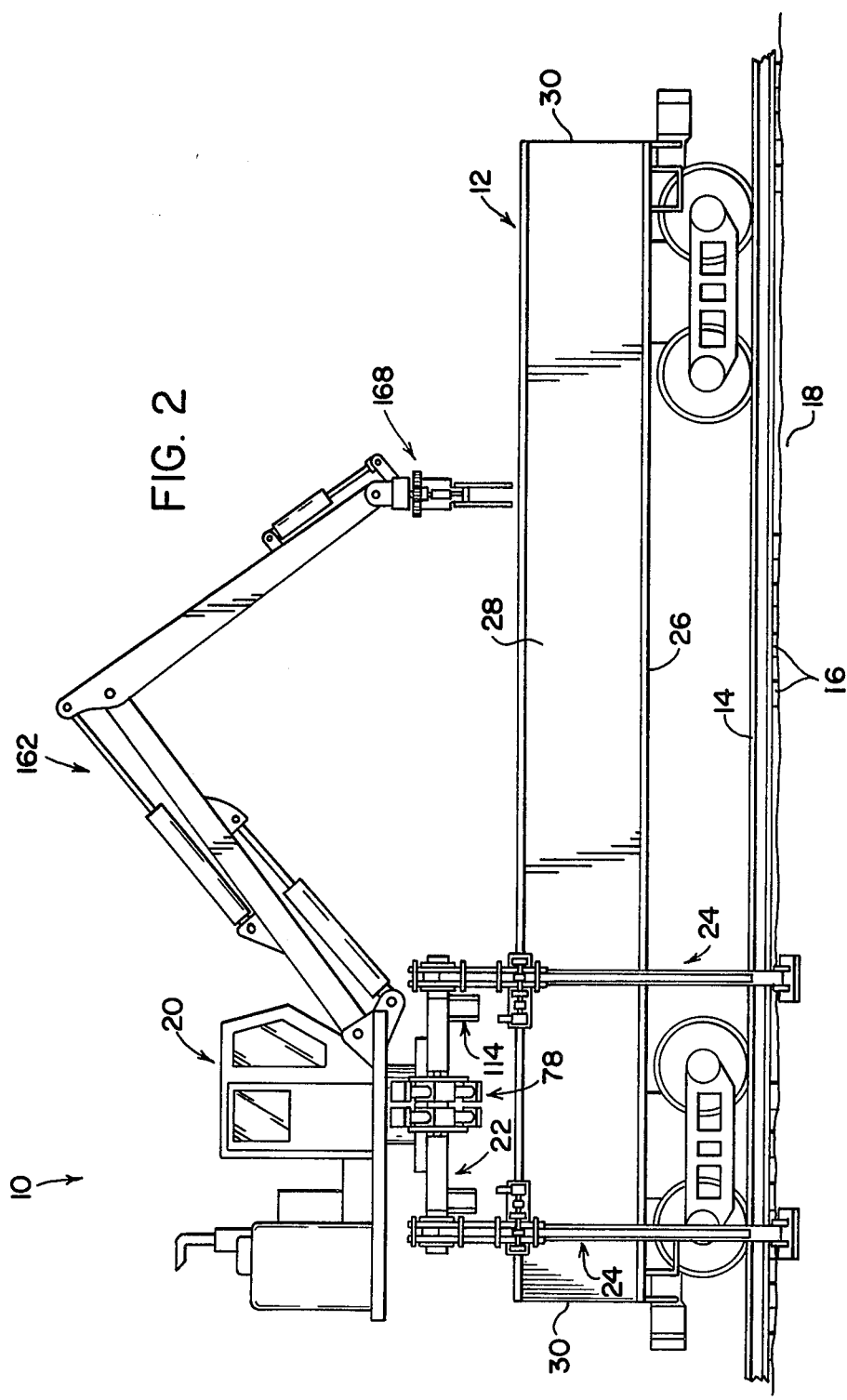
FIG. 2 is a side elevation view of the apparatus and car shown in FIG. 1.
Figure 3:
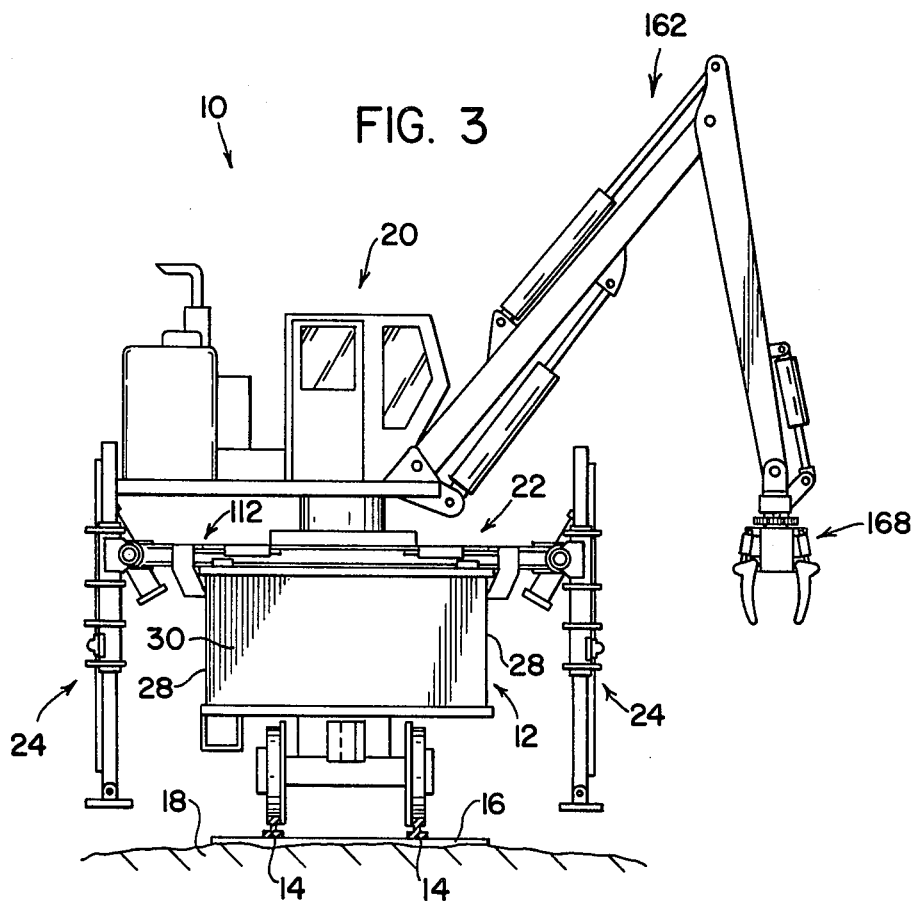
FIG. 3 is an end elevation view showing the apparatus supported on the gondola car.
Figure 4:
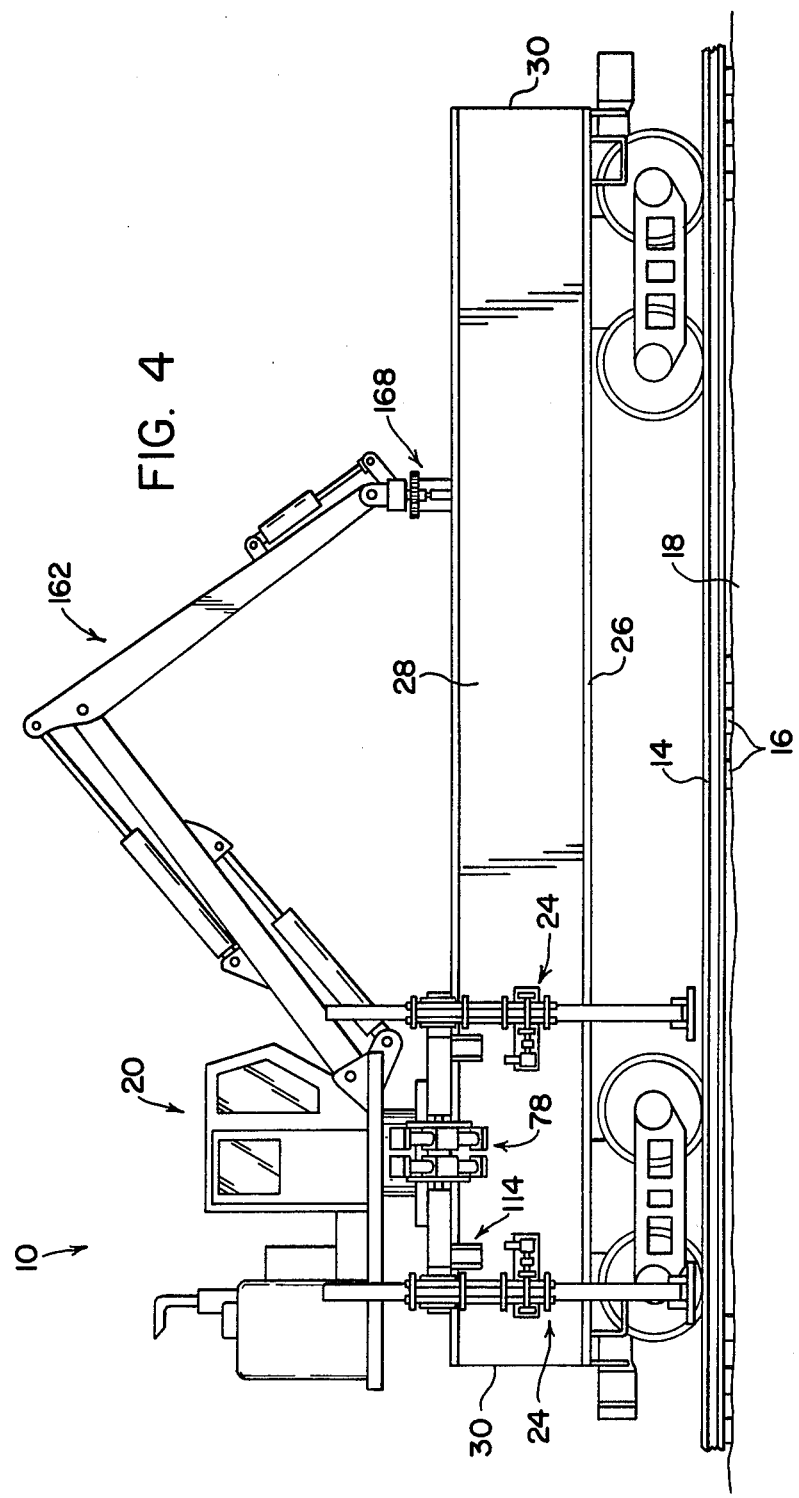
FIG. 4 is a side elevation view of the apparatus and car in FIG. 3.

Referring now in greater detail to the drawings wherein the showings are for the purpose of illustrating preferred embodiments of the invention only and not for the purpose of limiting the invention, railway car loading and unloading apparatus 10 is illustrated in FIGS. 1–4 in association with an open top gondola type railway car 12 which is supported for rolling movement along a railway defined by tracks 14 supported on railway ties 16 which are in turn supported on the bed of ballast material 18. Railway car 12 is a standard open top gondola car having a bottom 26, laterally spaced apart upright side walls 28 and laterally extending upright end walls 30 at opposite ends of side walls 28. Loading and unloading apparatus 10 basically includes a crane 20, a platform 22 on which crane 20 is pivotally mounted, and a plurality of leg assemblies 24 by which the platform is adapted to be elevated and lowered relative to car 12 as described in greater detail hereinafter. In use, apparatus 10 is adapted to straddle railway car 12 with leg assemblies 24 depending generally vertically and laterally outwardly of side walls 28 of the car. Leg assemblies 24 are operable to respectively engage ballast 18 and elevate the platform relative to the car as shown in FIGS. 1 and 2, and to lower the platform to rest on the top of car 12 as shown in FIGS. 3 and 4. When platform 22 is elevated as shown in FIGS. 1 and 2, railway cars are adapted to be moved along tracks 14 beneath the apparatus following a loading or unloading operation, and such loading and unloading operations are achieved with the apparatus supported on an underlying car as shown in FIGS. 3 and 4.

Figure 5:
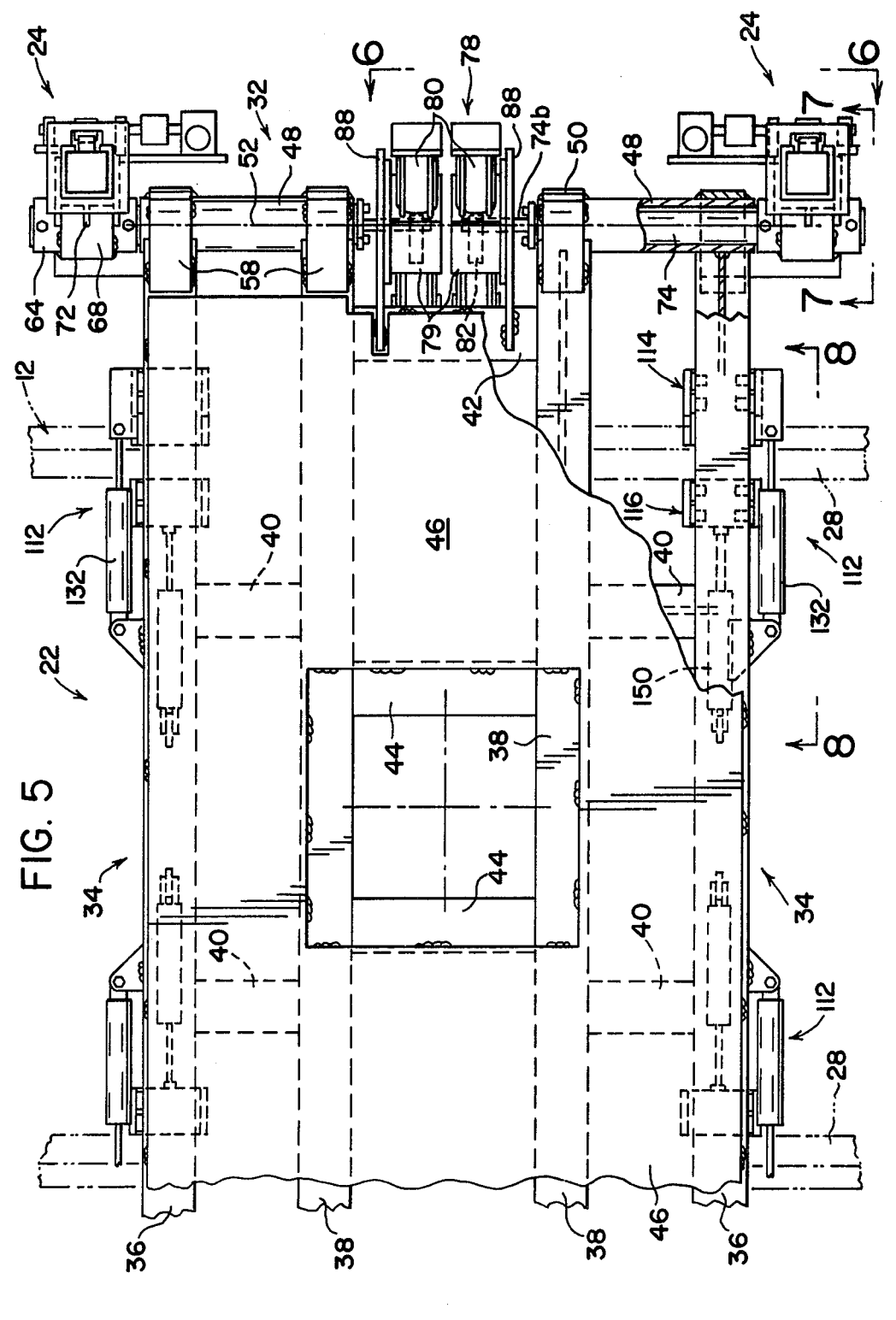
Figure 6:
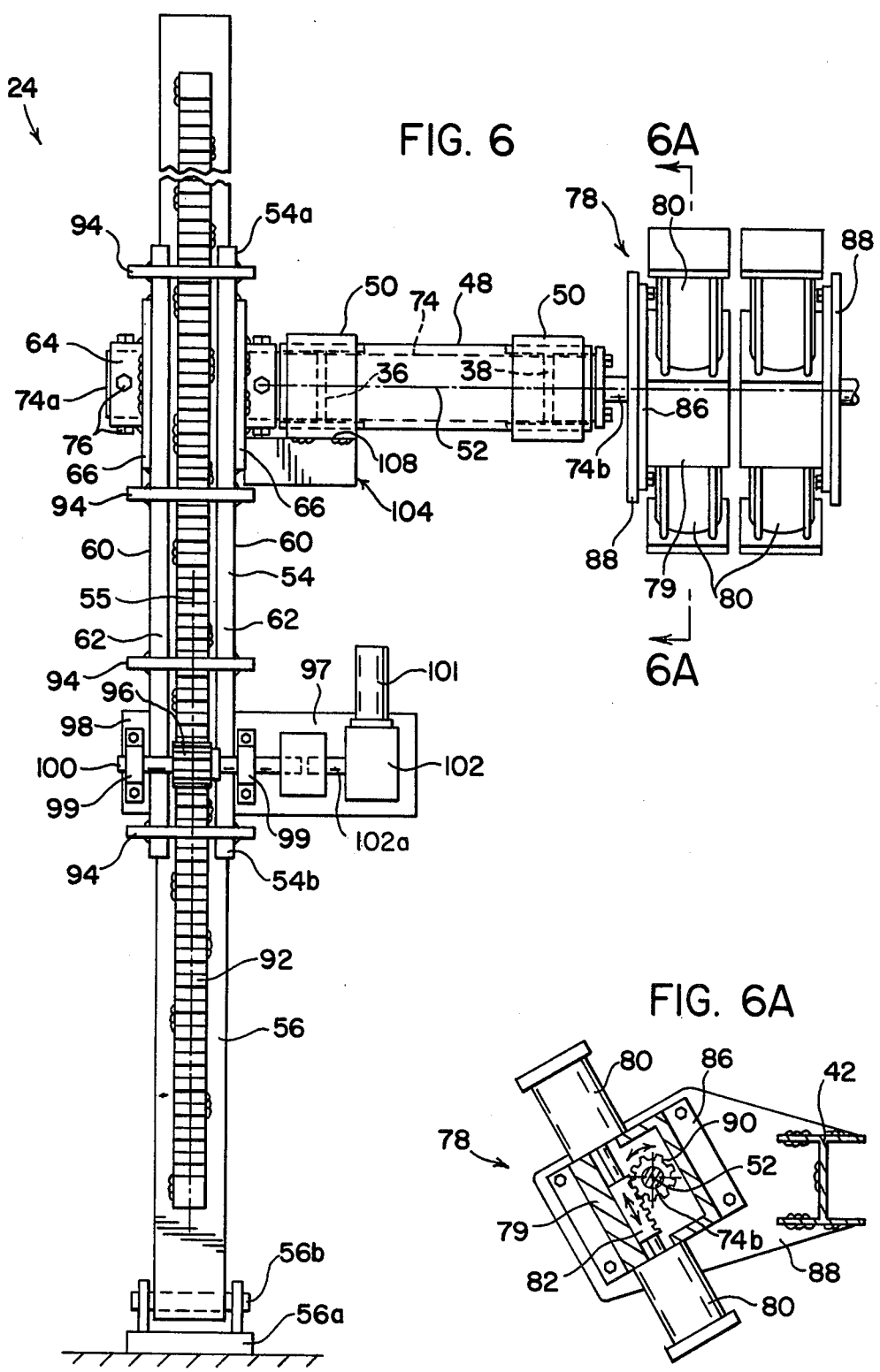
FIG. 6 is a side elevation view of the platform and leg assembly looking in the direction of line 6—6 in FIG. 5.
Figure 7:
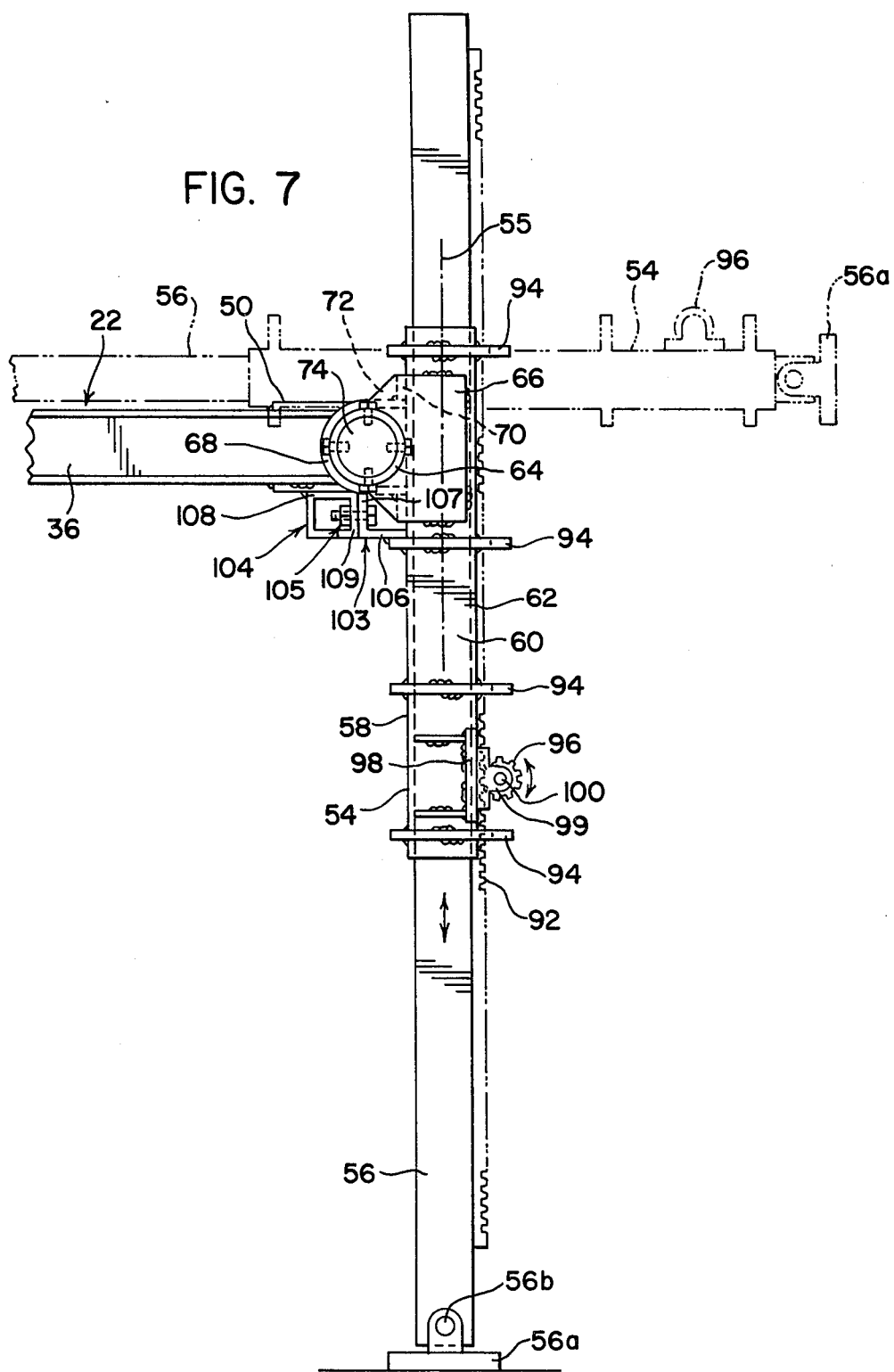
FIG. 7 is an end elevation view of one of the leg assemblies taken along line 7—7 in FIG. 5.

The following description of platform 22 and leg assembly 24 is with respect to the disposition of the platform relative to car 12 and the railway therebeneath when the apparatus is positioned as shown in FIGS. 1–4. With such orientation in mind, and as best seen in FIGS. 5–7, platform 22 has longitudinally extending opposite sides designated generally by numerals 32 and laterally extending opposite ends designated generally by numerals 34. The platform is comprised of a frame assembly including laterally extending outer I-beams 36 and laterally extending inner I-beams 38 each interconnected with the corresponding outer beam by I-beam cross members 40. Inner I-beams 38 are interconnected by I-beam cross members 42 adjacent the opposite sides of the platform and by I-beam cross members 44 spaced inwardly from beams 42. Cross beams 44 together with the portions of beams 38 therebetween provide an opening through the platform for hydraulic lines between crane 20 and hydraulically actuated components on the platform, as will become apparent hereinafter, and also provide frame portions to facilitate mounting of the crane on the platform. The several beam members of the frame assembly are rigidly interconnected, such as by welding, and the platform is preferably provided with a floor 46 defined, for example, by steel plates overlying the upper sides of the flanges of the frame beams and interconnected therewith such as by welding.

Leg assemblies 24 are provided at the opposite sides 32 of platform 22 and, for the purpose set forth more fully hereinafter, preferably are mounted on the platform so as to enable displacement of the leg assemblies between positions in which the leg assemblies depend from the platform and positions in which the leg assemblies are generally parallel to the plane of the platform as defined for example by floor 46. In the embodiment illustrated, such a pivotal capability is achieved by providing the opposite sides of platform 22 with longitudinally extending bearing sleeves 48, each extending between an outer frame beam 36 and the adjacent inner frame beam 38. Sleeves 48 are rigidly interconnected with the ends of the corresponding frame beams 36 and 38, such as by welding, and by means of support straps 50 extending thereabout and welded to the top and bottom flanges of the frame beams. Preferably, the ends of the webs of beams 36 and 38 are arcuately recessed to receive sleeves 48 and thus further enhance stabilization of the sleeves relative to the platform. The sleeves at each end 32 of the platform are coaxial and provide a longitudinally extending horizontal pivot axis 52 parallel to the plane of the platform.

Leg assemblies 24 and the mounting thereof on opposite sides 32 of the platform are identical, whereby it will be appreciated that the following description of the leg assemblies and the mounting thereof on the right hand side of the platform as seen in FIG. 5 is applicable to the leg assemblies and mounting arrangement on the opposite side of the platform. Each leg assembly 24 includes a leg supporting and guiding member 54 having an axis 55 which, in the use position of the apparatus shown in FIGS. 5–7, extends generally vertically with respect to platform 22. Each leg assembly further includes a leg member 56 coaxial with and slidably interengaging the corresponding support and guide member 54 for displacement longitudinally thereof as set forth more fully hereinafter. Support and guide member 54 is a square sleeve open along its outer side, for the purpose set forth hereinafter, and includes an inner wall 58, side walls 60, and outer walls 62 extending toward one another and parallel to inner wall 58. Upper end 54a of each support and guide member 54 is provided with a horizontally extending mounting sleeve 64 disposed against inner wall 58 thereof and secured to member 54 by mounting plates 66 welded to side walls 60 and sleeve 64, and by a mounting strap component 68 extending about sleeve 64 and rigidly interconnected with inner wall 58. More particularly in this respect, plates 70 are welded to the opposite ends of strap 68 and to inner wall 58, and gusset members 72 are welded to plate 70 and to strap 68.

Each leg assembly 24 is pivotally mounted on platform 22 by means of a corresponding shaft 74 extending through bearing sleeve 48 and having an outer end 74a extending through mounting sleeve 64 and an inner end 74b of reduced diameter and terminating generally centrally of the platform with respect to a laterally extending centerline of the latter. Shaft 74 is pivotally supported by the corresponding bearing sleeve 48, and leg assembly 24 is interconnected with shaft 74 for pivotal movement therewith by means of a plurality of threaded studs 76 extending through mounting sleeve 64 and into shaft 74. In the embodiment illustrated, pivotal movement of shaft 74 and thus pivotal displacement of leg assembly 24 about axis 52 is achieved by a rack and pinion arrangement. More particularly, platform 22 is provided adjacent inner end 74b of shaft 74 with a hydraulically actuated reciprocable rack assembly 78 including a housing 79, hydraulic cylinders 80 on opposite sides of the housing and a reciprocable toothed rack 82 having its opposite ends connected to and between pistons in the opposed cylinders. Accordingly, hydraulic displacement of the pistons in opposite directions displaces rack member 82 in opposite directions. Housing 79 is provided with a mounting plate 86, and rack assembly 78 is mounted on platform 22 such as by bolting mounting plate 86 to a support plate 88 welded to the top and bottom flanges of frame beam 42. Inner end 74b of shaft 74 is provided with teeth 90 in meshing engagement with the teeth of rack 82, whereby reciprocation of the rack in opposite directions imparts pivotal movement to shaft 74 and thus leg assembly 24 in opposite directions about axis 52.

With further regard to leg assemblies 24, as seen in FIGS. 5-7, each leg member 56 is coaxial with respect to the corresponding support and guide member 54. Preferably, legs 56 are of tubular construction corresponding in cross-sectional contour to leg support and guiding member 54 and, accordingly, have inner, side and outer walls slidably interengaged respectively with walls 58, 60 and 62 of member 54. The lower ends of legs 56 are preferably provided with ground engaging pad members 56a which are pivotally attached thereto such as by pins 56b providing pivot axes parallel to the sides of platform 22. Such pads of course pivot to assume a disposition corresponding to the underlying ground when the legs are lowered, thus to stabilize ground support of the platform. Outer walls 62 of support and guide member 54 provide the latter with an open outer side, and the outer wall of leg member 56 is provided with a toothed rack 92 extending therealong and projecting outwardly through the opening defined by walls 62 of member 54. In order to restrain displacement of the side and outer walls of member 54 toward and away from one another because of the open outer side thereof, a plurality of reinforcing collars 94 are provided about member 54 and are welded thereto at spaced locations along the length thereof. Each leg member 56 is adapted to be raised and lowered relative to support and guide member 54 and thus platform 22 by means of a corresponding pinion 96 having teeth in meshing engagement with the teeth of rack 92 and supported on member 54 for rotation relative thereto. More particularly, lower end 54b of support and guide member 54 is provided with a mounting plate assembly for pinion 96, and a drive arrangement therefor, which mounting plate assembly includes mounting plate components 97 and 98 welded or otherwise secured to side walls 60 of member 54. Pinion 96 is positioned for meshing engagement with the teeth of rack 92 and is supported for rotation by means of bearing assemblies 99 on mounting plates 97 and 98 and each of which receives a corresponding portion of the pinion shaft 100. Mounting plate 97 is provided with a hydraulic motor 101 mounted thereon through a gear box 102 having an output shaft 102a coupled with the corresponding end of pinion shaft 100. Accordingly, operation of hydraulic motor 101 in opposite directions imparts rotation to pinion 96 in opposite directions and thus displaces leg 56 in axially opposite directions relative to support and guide member 54. It will be appreciated of course that hydraulic motors 101 and cylinders 80 of hydraulic rack mechanisms 78 are connected to suitable sources of hydraulic fluid under pressure through fluid flow lines and controls, not shown. Preferably, crane mechanism 20 provides the source of hydraulic fluid, as explained hereinafter.

Preferably, leg assemblies 24 are adapted to be releaseably retained or held in the vertical dispositions thereof relative to platform 22 to stabilize the apparatus during elevating and lowering of the platform relative to ground. In the embodiment disclosed herein, such retention is achieved by members 103 and 104 mounted respectively on leg assembly 24 and platform 22, and by a separable fastener 105 releaseably connecting the members. More particularly, member 103 is an L-shaped bracket having one leg 106 welded to inner wall 58 of member 54 and to the reinforcing collar 94 beneath mounting sleeve 64 and the other leg 107 welded to strap 68 extending about sleeve 64. Member 104 is a tubular sleeve of square cross-section extending longitudinally outwardly from platform outer end beam 36 behind the corresponding support and guide member 54. Member 104 has an upper wall 108 welded to bearing sleeve straps 50, and thus to the undersides of platform beam 36, and has an outer wall 109 facially engaging bracket leg 107 when the leg assembly is in the vertical disposition. Leg 107 and wall 109 are provided with aligned openings receiving fasteners 105 which may be a headed bolt and nut assembly. The latter is readily accessible from the open outer end of member 104 and is of course removed when it is desired to pivot leg assemblies 24 from the vertical to the horizontal dispositions thereof relative to platform 22.

When legs 56 are elevated to lower platform 22 onto the top edges of the side walls of a car, as shown in FIGS. 3 and 4 of the drawing, it is preferred to clampingly interengage the platform and car so as to stabilize the apparatus during loading and unloading operations. Such clamping can be achieved in any desired manner and, in the preferred embodiment herein disclosed, is achieved by a plurality of clamping assemblies on the platform each comprised of a pair of opposed clamping members displaceable toward and away from one another to respectively engage and disengage one of the side walls of a railway car therebetween when the platform is resting on the top edges of the side walls. More particularly in this respect, as best seen in FIGS. 8-10 of the drawing, each of the laterally extending outer platform beams 36, only one of which is visible in FIG. 8, is provided with a pair of clamping assemblies 112 comprised of outer and inner clamping members 114 and 116, respectively, adapted to receive the top portion of the corresponding railway car side wall 28 therebetween. Clamping assemblies 112 are identical, as is the operation thereof, whereby it will be appreciated that the following description of one of the assemblies is applicable to the others.

As best seen in FIGS. 8 and 9, outer clamping member 114 is comprised of side plate members 118 and 120 spaced apart and interconnected by a bottom plate 122 and cross bars 124, which bottom plate and cross bars are welded or otherwise rigidly interconnected with the side plates. Side plates 118 and 120 are spaced apart to receive bottom flange 36a of frame beam 36 therebetween and are each provided with a pair of upper rollers 126 adapted to engage flange 36a and support the clamping member for movement along beam 36. Additionally, each of the side plates is provided with a roller 128 adapted to engage the underside of beam flange 36a to stabilize movement of the clamping member along the beam. Generally, the top edges of side walls 28 of a railway car are provided with a rail or bead configuration which extends laterally outwardly from the plane of the side wall and thus provides an outer edge, such as that designated by numeral 28a in FIG. 8, which is laterally spaced from the plane of side wall 28. Preferably, the edges of side plate members 118 and 120 of clamping member 114 which face car wall 28 are contoured to engage the outer side of the car wall so as to optimize clamping engagement therewith. Accordingly, in the embodiment illustrated, the inwardly facing edges of side plates 118 and 120 extend downwardly and inwardly relative to platform 22, whereby it will be appreciated that the clamping members operate to pull platform 22 downwardly relative to the railway car when the clamping members engage the outer sides of walls 28. Side plate 120 of clamping member 114 extends upwardly along the outer side of frame beam 36 and is provided at its upper end with an outwardly extending flange 130. Displacement of the clamping member in opposite directions along beam 36 is achieved by a hydraulic piston and cylinder unit including a cylinder 132 pivotally connected to beam 36 and a piston rod 134 having its outer end pivotally connected to flange 130 of the clamping member. Accordingly, it will be appreciated that extension and retraction of piston rod 134 relative to cylinder 132 respectively displaces clamping member 114 outwardly and inwardly relative to the outer side of car wall 28.

It will be appreciated from the description of the clamping assemblies thus far that the outer clamping members on each frame beam 36 engage the corresponding car wall 28 in the direction toward one another and would, therefore, suffice to clamp the platform in place on the car. However, in order to minimize potential damage or distortion to the railway car walls by such inwardly directed clamping forces, it is preferred to provide each of the clamping assemblies with inner clamping members 116, whereby the clamping force is generally localized at the four points of clamping engagement with car walls 28. As best seen in FIGS. 8 and 10 of the drawing, inner clamping members 116 are similar to outer clamping members 114 and, in this respect, are defined by side plate members 136 and 138 interconnected by cross plates 140 and 142 and cross bars 144, which cross plates and bars are welded or otherwise rigidly secured to the side plates. The upper ends of side plates 136 and 138 are each provided with a pair of rollers 146 adapted to engage the upper surface of bottom flange 36a of frame beam 36, and are provided with lower rollers 148 for stabilizing movement of the clamping member along the beam. Generally, the inner surfaces of railway car side walls 28 are flat and, accordingly the edges of side plates 136 and 138 facing the inner surface of side wall 28 are planar vertical surfaces. Displacement of inner clamping member 116 in opposite directions along beam 36 is achieved by a hydraulic piston and cylinder unit including a cylinder 150 pivotally secured to beam 36 and a piston rod 152 extending from the cylinder and having its outer end pivotally secured to cross plate 142 of the clamping member. Accordingly, it will be appreciated that extension and retraction of piston rod 152 respectively displaces clamping member 116 toward and away from the inner side of car wall 28. It will be further appreciated that each of the hydraulic piston and cylinder units of clamping assemblies 112 is connected to a suitable source of hydraulic fluid under pressure and through appropriate controls, not shown, to achieve the displacements of the piston rods relative to the cylinders and thus displacement of the clamping members toward and away from one another. Preferably, as explained hereinafter, crane unit 20 provides the hydraulic fluid source and the flow control functions with respect thereto.

With reference once again to FIGS. 1-4 of the drawing, the crane mechanism 20 mounted on platform 22 can be any one of a variety of commercially available cranes, or could be specially built to provide the desired functions thereof in connection with the loading and unloading of railway cars. In the embodiment herein illustrated and described, crane unit 20 is a commercial unit sold by Husky Hydraulics Company of Two Harbors, Minn. under the company's product designation XL-200. The latter crane is a ground supported crane which, in connection with the present invention, is mounted on platform 22 as opposed to the ground supported base therefor. Basically, the crane unit includes a turntable 154 suitably mounted on the frame assembly of platform 22 and by which the unit is rotatable 360°, and a platform 156 on the turntable and supporting a cab 158 for the operator. Platform 156 is counterweighted at one end and is also provided with a selfcontained power supply at the one end including a diesel engine 160, and the platform supports a hydraulically operated boom assembly 162 at the opposite end. Boom assembly 162 includes a first boom member 164 pivotal upwardly and downwardly relative to platform 156, a second boom member 166 pivotally interconnected with boom member 164, and a grapple assembly 168 on the free end of boom member 166 and adapted to be operated to engage and disengage material to be loaded and unloaded from a car. Boom member 164 is adapted to be pivoted upwardly and downwardly by hydraulic piston and cylinder assembly 170, and boom member 166 is adapted to be pivoted relative to boom member 164 by means of a hydraulic piston and cylinder assembly 172. It will be appreciated that hydraulic fluid under pressure for operating the boom members and for operating portions of the grapple assembly as described hereinafter is part of the self-contained power supply of the crane assembly. Moreover, as mentioned hereinbefore, the self-contained power supply also provides the source of hydraulic fluid under pressure for operating hydraulic motors 101 for elevating and lowering legs 56, for operating hydraulic rack mechanisms 78 for pivoting leg assemblies 24, and for operating the hydraulic piston and cylinder units of clamping assemblies 112. Moreover, as is well known in connection with such crane units, control levers for achieving the desired hydraulic fluid flow control functions are provided in the cab for manipulation by the crane operator.

Grapple assembly 168 is illustrated in the drawings and is described in detail hereinafter in that the structure thereof enables the loading of railway ties in a car in a generally vertical disposition relative thereto. It will be appreciated, however, that in connection with the loading and unloading of railway cars with apparatus according to the present invention, other grapple mechanisms can be readily employed, and material handling devices other than grapples can likewise be readily employed. For example, the boom assembly can be provided with a magnetic pick-up head to enable the loading and unloading of metal railway parts such as spikes, tie plates, and the like. In connection with the latter, most crane units, including the one specifically referred to hereinabove, include magnet generators and controls to enable use thereof with such a magnet head.

Grapple mechanisms have been provided heretofore on cranes of the type described hereinabove and for the purpose of loading and unloading railway ties with respect to gondola cars. Such previous grapple units, however, are associated with the crane boom in a manner whereby the grapple unit always assumes a horizontal disposition relative thereto when elevated above ground. In this respect, with reference to FIGS. 11–13 of the drawing, such a previous grapple unit includes opposed material engaging jaw members 174 mounted on a supporting head 176 for pivotal movement about corresponding jaw axes 175. The jaws are pivotal toward and away from one another and, accordingly, between closed and open positions with respect to an article such as a railway tie T shown in FIGS. 11 and 12. The jaw members are actuated by corresponding hydraulic piston and cylinder assemblies 178 between the jaw members and head 176, and head 176 is rotatably mounted on a grapple support spindle 180 by means of bearings 181 therebetween. Accordingly, the jaws are rotatable as a unit about a vertical axis 182 transverse to the jaw axes 175, as viewed in FIGS. 11 and 12. Such rotation is achieved by means of a gear 183 driven by a hydraulic motor 184 on support spindle 180, and a gear 186 mounted on head member 176 and in meshing engagement with gear 183. It will be appreciated of course that piston and cylinder units 178 and hydraulic motor 184 are connected to the power supply unit of the crane. Such grapple units heretofore provided are further characterized by pivotally mounting grapple support spindle 180 on boom member 166 by means of a pin 188 having an axis transverse to jaw axes 175 and to axis 182. Accordingly, it will be appreciated that such a grapple is free swinging relative to boom member 166. Therefore, when boom member 166 is pivoted relative to boom member 164, the pivot axis therebetween being parallel to the axis of pin 188, the grapple assembly remains in a vertical disposition whereby the railway tie or other article between jaws 174 remains in a generally horizontal disposition.

Figure 11:
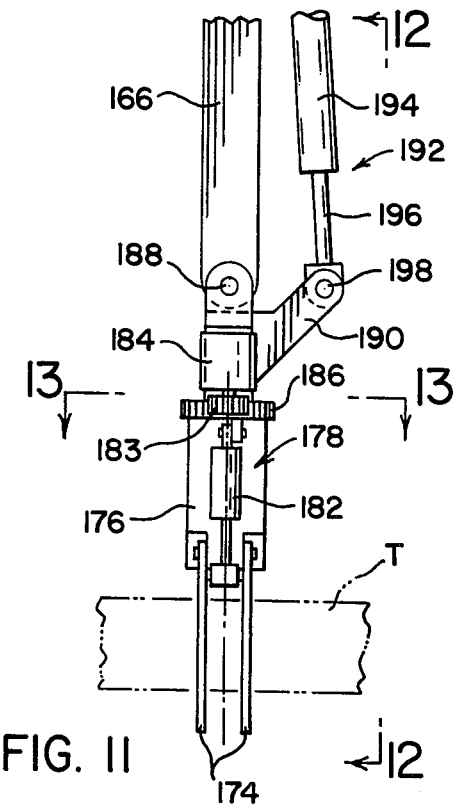
FIG. 11 is a side elevation view of the grapple assembly associated with the crane.
Figure 12:
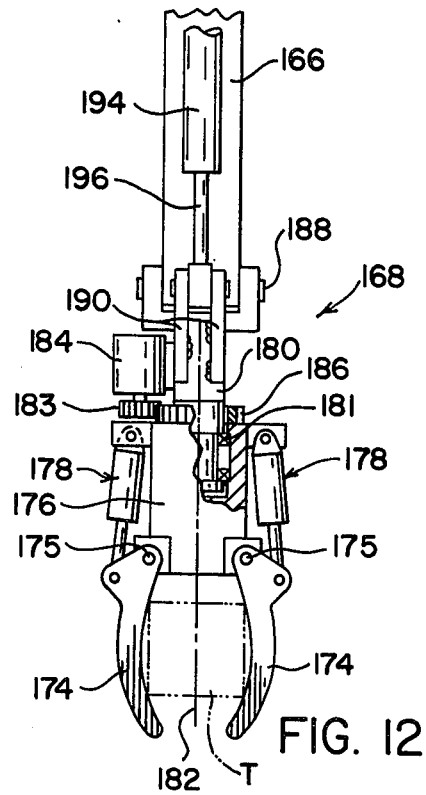
FIG. 12 is an end elevation view of the grapple assembly, partially in section, looking in the direction of line 12—12 in FIG. 11.
Figure 13:
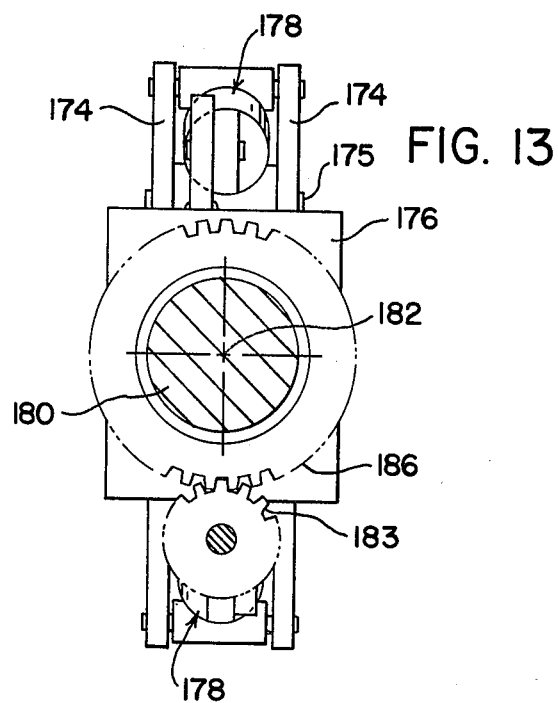
FIG. 13 is a cross-sectional view of the grapple assembly taken along line 13—13 in FIG. 11.

In accordance with another aspect of the present invention, and for the purpose set forth hereinafter, pivotal movement of the grapple assembly relative to the axis of pin 188 is controlled to enable pivoting of an article such as railway tie T to a desired angular relationship relative to boom member 166 regardless of the position thereof relative to boom member 164. In this respect, as shown in FIGS. 11 and 12, grapple support spindle 180 is provided with a pair of arms 190 extending laterally outwardly therefrom transverse to pin 188, and a hydraulic piston and cylinder unit 192 is connected between arms 190 and boom member 166. Hydraulic unit 192 enables positive displacement of the grapple assembly relative to boom member 166 and in opposite directions about the axis of pin 188. More particularly, the hydraulic piston and cylinder unit includes a cylinder 194 having one end pivotally connected to boom member 166, as seen in FIGS. 1–4, and a piston rod 196 extending from the other end of the cylinder and having its outer end pivotally connected with arms 190 by means of a pin 198. It will be appreciated that hydraulic actuation of the piston and cylinder unit is achieved through use of the self-contained power supply of the crane, and that extension and retraction of piston rod 196 relative to cylinder 194 displaces the grapple unit respectively clockwise and counterclockwise relative to boom member 166 as viewed in FIG. 11 of the drawing.

Figure 14:
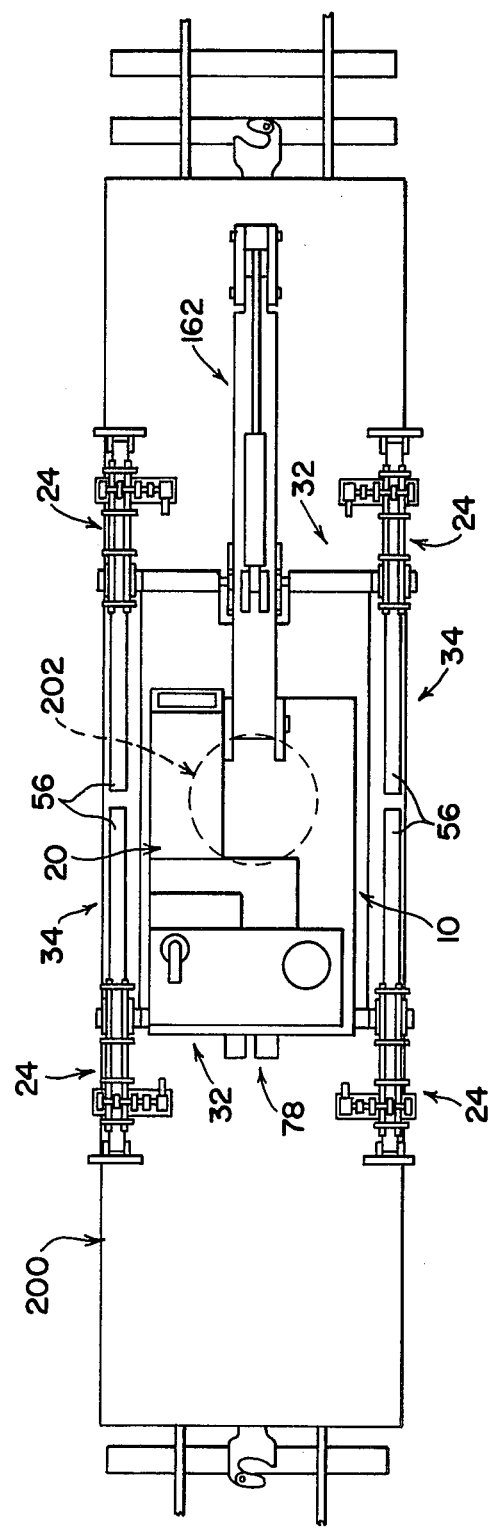
FIG. 14 is a plan view showing the apparatus supported on a flat railway car for transportation thereby.

The loading and unloading apparatus as described hereinabove is adapted to be transported from one railway site to another along the railway and on a standard flat bed railway car such as car 200 illustrated in FIG. 14 of the drawing. Preferably, for the reason set forth hereinafter, railway car 200 is provided with a free turning turntable 202 on which platform 22 is adapted to rest. When loaded on railway car 200, legs 56 of the leg assemblies are in the raised positions thereof relative to platform 22, and the leg assemblies 24 are pivoted to the horizontal positions thereof generally parallel to platform 22 as described hereinabove. Further, platform 22 is positioned on the car for laterally extending ends 34 thereof to extend in the direction of the sides of the car, and crane 20 is positioned for boom assembly 162 to extend in the latter direction. Once the loading and unloading apparatus is initially placed either in a ground supported position such as that shown in FIG. 1 with the platform elevated for a flat car to be moved therebeneath, or on a flat car as shown in FIG. 14, the apparatus is thereafter basically self-loading and unloading for purposes of transportation and use. In this respect, assuming the apparatus to be on flat car 200 and at a site for use, the apparatus is readily unloaded by pivoting platform 22 ninety degrees from the position shown in FIG. 14, whereby the platform spans the underlying railway, actuating hydraulic rack mechanisms 78 to pivot leg assemblies 24 from the horizontal to the vertical dispositions thereof and locking the leg assemblies in the vertical dispositions, and then operating hydraulic motors 101 to lower legs 56 of the leg assemblies into engagement with the railway ballast material after which continued operation of hydraulic motors 106 achieves elevation of platform 22 and crane 20 to the position shown in FIGS. 1 and 2. Such elevation of the platform enables movement of flat car 200 from beneath the platform and movement of a railway car 12 therebeneath for loading or unloading as the case may be. When car 12 is so positioned beneath platform 22, hydraulic motors 101 are actuated to raise legs 56 relative to platform 22 and thus lower the platform onto the top edges of side walls 28 of the car as shown in FIGS. 3 and 4. It will be appreciated that during such lowering of the platform the clamping members of clamping assemblies 112 are spaced apart to receive car walls 28 therebetween. When platform 22 rests on the top edges of side walls 28, the piston and cylinder units associated with the clamping members are actuated to displace the latter toward one another and into engagement with the inner and outer sides of walls 28 to clamp the apparatus in place on the car. Thereafter, crane 20 is operable to achieve loading and/or unloading of the car. Following such loading or unloading operation, the hydraulic units for the clamping assemblies are actuated to displace the clamping members away from one another, after which hydraulic motors 101 are actuated to lower legs 56 and thus elevate platform 22 to a position above the railway car. Thereafter, the car is moved from beneath the platform and another car is positioned therebeneath and the foregoing procedure is repeated to achieve loading or unloading of the new car. When it is desired to transport the apparatus from one location to another, flat car 200 is moved into position beneath platform 22, and hydraulic motors 101 are actuated to raise legs 56 so as to lower platform 22 onto turntable 202 of the flat car. Leg assemblies 24 are then pivoted from the vertical to the horizontal dispositions thereof through actuation of hydraulic rack mechanisms 78, after which the turntable 202 and thus the platform is rotated 90° to the position illustrated in FIG. 14. Advantageously, such rotation of platform 22 relative to the flat car can be achieved by the crane. In this respect, the grapple can be manipulated to grasp a part of the flat car, or an adjacent car, after which the crane is actuated in a manner which normally causes rotation of the crane relative to platform 22. Since the crane is effectively held in place relative to the flat car by the grapple, the free turning turntable 202 enables such actuation of the crane to cause platform 22 to pivot relative to the crane and thus the flat car.

Figure 15:
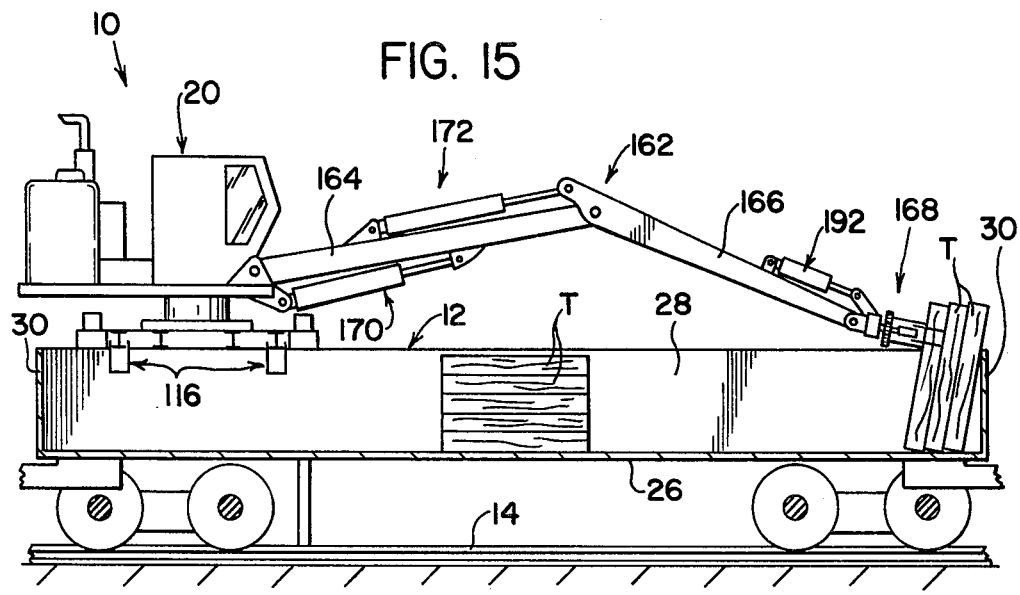
FIGS. 15 and 16 are side elevation views illustrating the vertical loading of railway ties in a gondola car through use of the apparatus.
Figure 16:
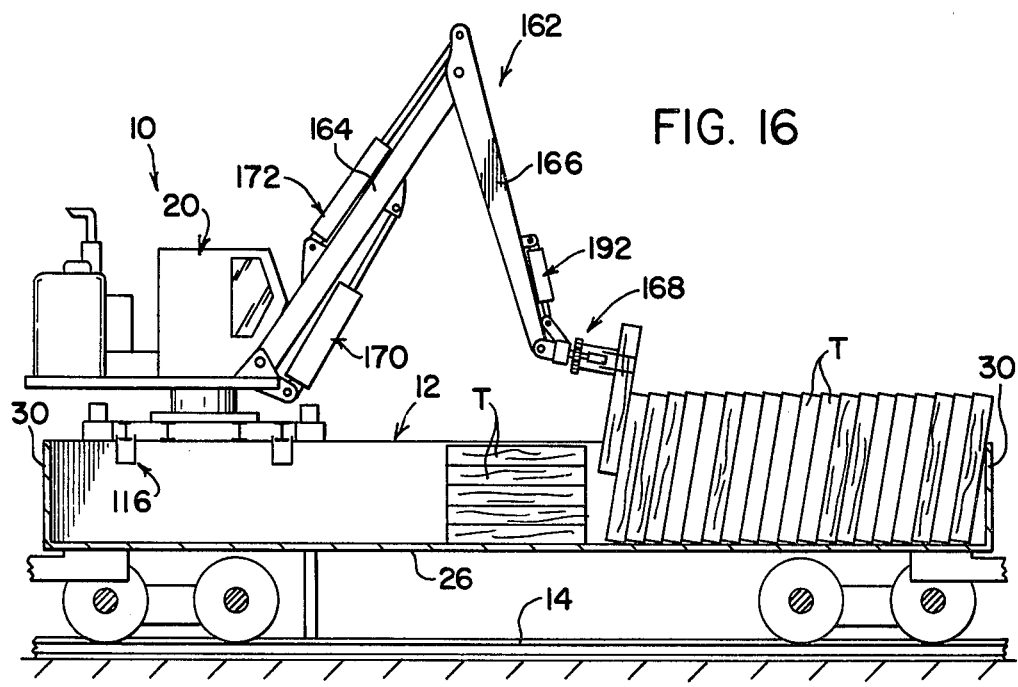

With further regard to the improved grapple mechanism as described hereinabove in connection with FIGS. 11-13, FIGS. 15 and 16 illustrate use of the apparatus and the grapple mechanism in connection with a method of loading railway ties vertically in an open top railway car. Assuming ties to be lying on the ground adjacent the railway line, and the loading and unloading apparatus to be supported on car 12 as described hereinabove, it will be appreciated that the operator of crane 20 can manipulate the boom assembly and grapple mechanism for the latter to grasp a tie on the ground, elevate and position the tie over the open top of the car, and then manipulate boom assembly 162 and grapple assembly 168 to position the tie generally vertically and leaning against an end wall 30 of car 12, as shown in FIG. 15 of the drawing. It will likewise be appreciated that the operator can successively load ties along end wall 30 between side walls 28 of the car to provide a first row of ties and then, in a like manner, progressively load additional rows in the direction from end wall 30 toward the center of the car. While it would be possible to completely load a car from one end thereof to the other in this manner by adding rows as close as possible to plateform 22 and then transferring the apparatus to the next adjacent car to enable completion of the filling operation, it will be appreciated that it is extremely difficult to maintain each and every row of the ties in flat abutting relationship with the preceding row. Accordingly, as seen in FIGS. 15 and 16, it is preferred to place one or more layers of ties in a horizontal disposition on bottom 26 of the car intermediate the opposite ends thereof and between the side walls 28 either before or sometime during the vertical stacking operation. Such layer or layers of ties provides an abutment for the last row of vertically stacked ties being loaded in the direction from one end wall toward the center of the car. Once the car has been filled to this extent, the loading apparatus can be transferred to the next adjacent car and the other end of the partially loaded car can be loaded in a similar manner. Alternatively, the loading and unloading apparatus can be supported on one end of a railway car such as shown in FIGS. 15 and 16 to facilitate loading the layers of ties in the center of the car, and the apparatus can then be transferred to the center portion of the car after which both ends of the car can be loaded toward the center with vertical rows of ties. The latter procedure only requires that the legs of the apparatus be of sufficient length to enable elevation of the platform to a height sufficient for the car and ties to pass therebeneath in that the ties are of a length greater than the height of the side and end walls of the railway car from the bottom thereof. In any event, the vertical loading of railway ties in a car in the foregoing manner, as opposed to random loading or horizontal layering as is required with previous loading and unloading apparatus, considerably reduces the number of gondola cars required for a given tie handling operation.

Figure 17:
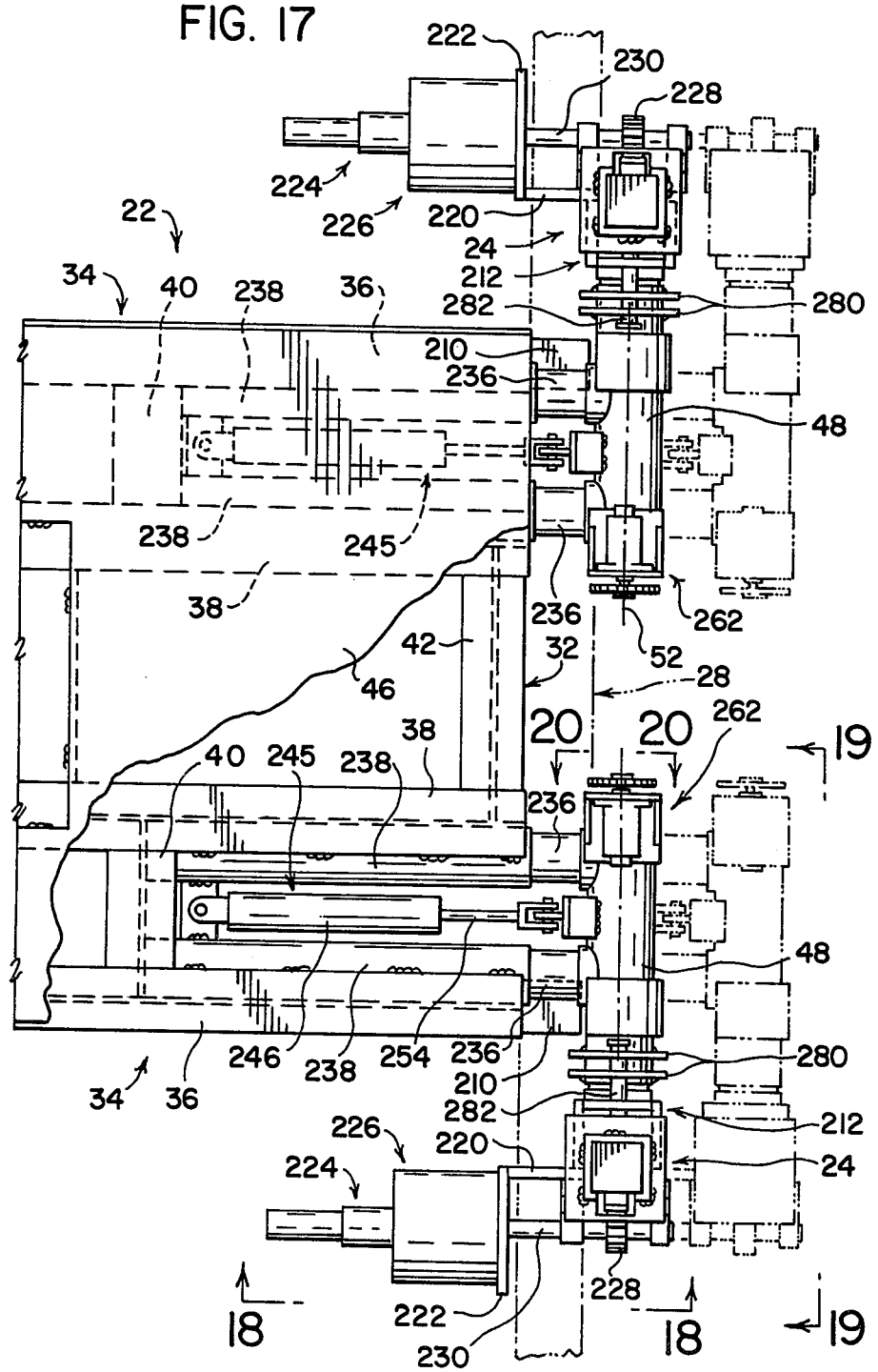
FIG. 17 is a plan view of one side of a modified platform and leg arrangement for railway car loading and unloading apparatus according to the present invention.

FIGS. 17-26 illustrate a modification of the platform and leg supporting arrangement of the apparatus described hereinabove and which advantageously enables minimizing the lateral projection of the platform and leg assembly outwardly of the sides of a railway car during use of the apparatus, and clamping interengagement of the apparatus with the car during use. A number of the component parts of the platform and leg assemblies in FIGS. 17-26 are of the same basic construction as shown and described hereinabove in connection with platform 22 and leg assemblies 24, whereby like numerals appear in FIGS. 17-26 with respect to such similar constructions. Further, while only one side of the platform and the corresponding pair of leg assemblies are shown in FIG. 17, it will be appreciated that the other side of the platform and the leg assemblies thereon are the same, whereby the following description is applicable thereto.

Referring now to FIGS. 17-26, platform 22 has longitudinally extending opposite sides 32 and laterally extending opposite ends 34, sides 32 being disposed adjacent the corresponding one of the side walls 28 of a railway car 12 when the apparatus is positioned for use in connection therewith. Further, the platform is comprised of a frame including I-beams 36, 38, 40, 42 and 44 positionally related and interconnected as described hereinabove and covered by a floor 46, but in the present embodiment I-beams 36 and 38 and floor 46 have been shortened in the direction between sides 32, and the underside of each beam 36 is provided with a laterally outwardly extending support plate 210 which is welded thereto. As described more fully hereinafter, this platform modification provides for the apparatus to be supported on railway cars of different widths with minimum lateral projection beyond the sides of the car.

Leg assemblies 24 in the embodiment illustrated in FIGS. 17-26 are of the same basic construction described hereinabove and, in this respect, each leg assembly includes a support and guide member 54 and a corresponding leg member 56. Further, leg assemblies 24 are mounted on the platform for pivotal movement about longitudinally extending horizontal axes corresponding to axes 52, and support for such pivotal movement is achieved by means of bearing sleeves and tubular shafts corresponding to bearing sleeves 48 and shafts 74 described hereinabove. However, as will be described in detail hereinafter, the orientation of the leg assemblies relative to the platform has been modified, the drive mechanisms for raising and lowering the leg members have been relocated, the bearing sleeves and shafts are mounted and supported on the platform for displacement of the leg assemblies laterally outwardly and inwardly relative thereto, and the drive arrangements for pivoting the leg assemblies have been modified.

Figure 21:
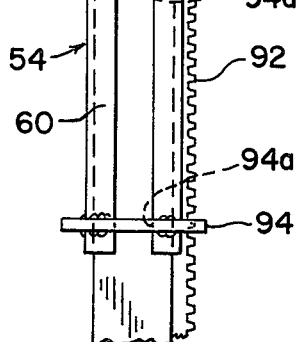
FIG. 21 is an elevation view showing the clamping member on each leg assembly, taken along line 21—21 in FIG. 18.

With regard in particular to the foregoing modifications, it will be seen first that leg assemblies 24 are reoriented for inner wall 58 of the corresponding support and guide member 54 to extend transverse to the corresponding shaft 74 and pivot axis 52. As best seen in FIGS. 19, 21 and 22, the outer end of the corresponding shaft 74 is attached to support and guide member 54 by means of a C-shaped mounting bracket 212 welded to member 54 and having an apertured plate portion 214 through which the shaft extends. The end of shaft 74 is welded to plate portion 214, and a spacer sleeve 216 and thrust bearing 218 are interposed between the end of sleeve 48 and bracket 212. This disposition of the leg assemblies provides for racks 92 on leg members 56 to face longitudinally outwardly of the corresponding end of the platform and minimizes lateral projection of the leg assemblies outwardly of the corresponding side of the platform.

Figure 18:
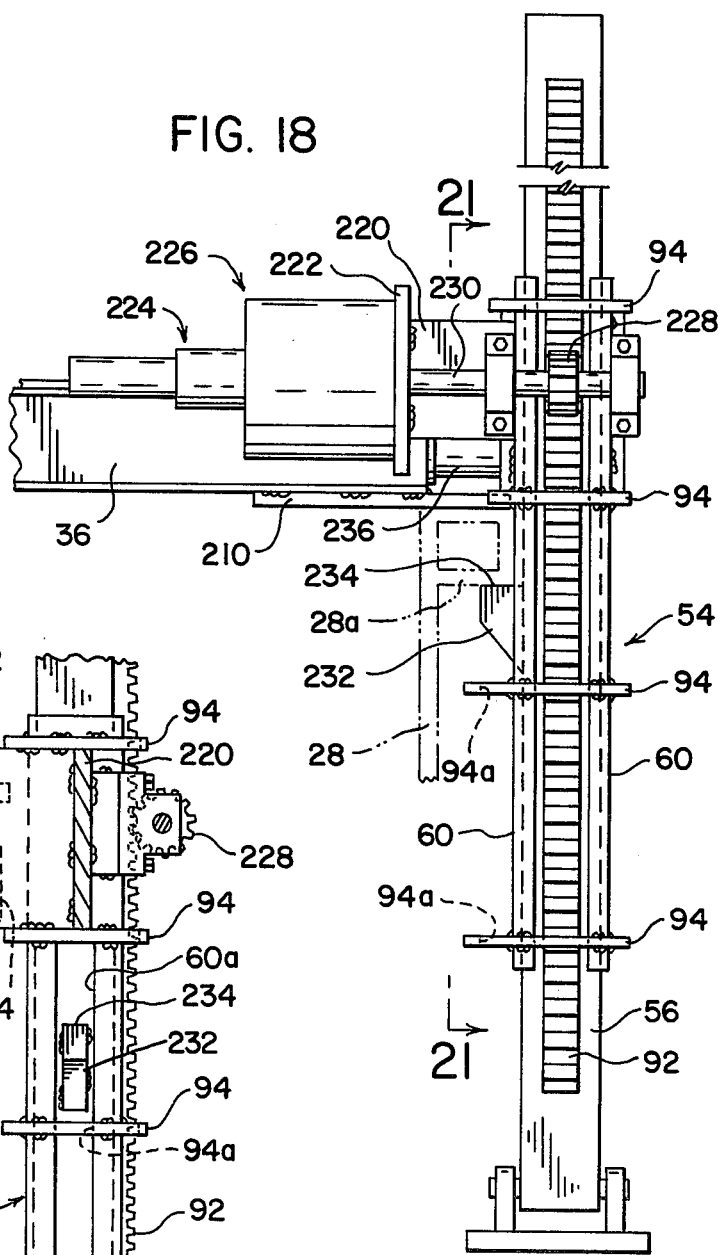
FIG. 18 is an end elevation view of the embodiment shown in FIG. 17 taken along line 18—18 in FIG. 17.

The pinion and drive motor arrangements for elevating and lowering leg members 56 relative to guide and support members 54 are relocated so as to promote maintaining minimum lateral projection of the leg assemblies. More particularly in this respect, as will be seen from FIGS. 17-19, a support plate 220 is welded to the laterally inner one of the walls 60 of each support and guide member 54, and a mounting plate 222 is welded to each support plate and extends longitudinally outwardly therefrom. A hydraulic motor 224 and gear box 226 are bolted or otherwise suitably mounted on each plate 222, and a pinion gear 228 is supported in meshing engagement with the teeth of the corresponding rack 92 and is adapted to be driven in opposite directions by the output shaft 230 of gear box 226, thus to elevate and lower leg member 56 relative to support and guide member 54. It will be appreciated of course that motors 224 are connected to a source of hydraulic fluid and through appropriate controls, not shown, to enable such driving of pinion gear 228. As best seen in FIGS. 18 and 19, the drive units for elevating and lowering leg members 56 are mounted on support and guide members 54 between the upper two reinforcing collars 94 thereon and are positioned above the top edge of car wall 28 when platform 22 rests thereon. As will further be seen in FIGS. 18, 19 and 21, a clamping member 232 is welded on the laterally inner wall of each leg member 56, and the inner wall 60 of the corresponding support and guide member 54 is provided with a vertially extending slot 60a through which the clamping member extends and which enables vertical displacement of the clamping member with leg member 56 during elevating and lowering thereof. The lower two reinforcing collars 94 are provided with recesses 94a to permit movement of clamping member 232 therethrough. Each clamping member 232 has an upper end 234 extending laterally inwardly of support and guide member 54 for the purpose set forth more fully hereinafter.

Each of the leg assemblies 24 is mounted on platform 22 for displacement laterally outwardly and inwardly relative thereto when the platform is resting on the upper edges of the side walls of a railway car and the legs are in the elevated positions. The support and displacing arrangements for the four leg assemblies are identical, and the preferred arrangement for supporting and displacing the leg assemblies is best seen in FIGS. 17 and 22-25 of the drawing. With reference to these Figures, each bearing sleeve 48 and the corresponding shaft 74 define part of a support arm arrangement for the corresponding leg assembly 24. Further, each support arm arrangement includes a pair of tubular arm members 236 having outer ends rigidly fastened to bearing sleeve 48 and inner ends slidably received in a corresponding support and guide sleeve 238. Each of the support and guide sleeves 238 is disposed adjacent the longitudinally inner side of the web of the corresponding one of the platform frame I-beams 36 and 38, which webs are designated 36a and 38a, repsectfully. Further, sleeves 238 are disposed between the upper and lower flanges of the corresponding I-beam, and the sleeves are secured in place relative to the I-beams such as by welding the sleeves to the I-beam flanges. The outer ends of arm members 236 preferably are welded to bearing sleeve 48, such as through the use of a corresponding mounting collar 240, U-shaped straps 242 and filler plates 244.

Lateral outward and inward displacement of each bearing sleeve 48 is achieved by means of a hydraulic piston and cylinder drive unit 245 disposed between sleeves 238. Each drive unit includes a cylinder 246 having its inner end connected against displacement relative to platform 22 by means of a mounting plate 248 extending between and welded to sleeves 238, and a retaining pin 250 extending through the mounting plate and a mounting bracket on the inner end of cylinder 246. The hydraulic drive unit 245 further includes a piston, not shown, slidably disposed in cylinder 246, and a piston rod 254 having its inner end connected to the piston and its outer end attached to bearing sleeve 48. More particularly in this respect, a mounting bracket assembly 256 is welded to sleeve 48, and a coupling member 258 on the outer end of the piston rod is detachably connected to the bracket assembly by means of a pin 260. It will be appreciated that the opposite ends of cylinder 246 are provided with hydraulic fluid supply openings not shown, adapted to be connected to a source of hydraulic fluid through suitable controls enabling fluid flow to and from the cylinder on opposite sides of the piston therein to achieve displacement of the latter and thus bearing sleeve 48 laterally outwardly and inwardly relative to platform 22. Accordingly, it will be appreciated that when platform 22 is resting on the top edges of the walls of a railway car, and leg members 56 of the leg assemblies 24 are elevated, the leg assemblies are laterally displaceable relative to the platform between retracted and extended positions as respectively designated by the solid line and broken line positions of the component parts in FIG. 17.

As will be best appreciated from FIG. 26 of the drawing, the later displacement capability with respect to the leg assemblies, and the elevating and lowering of the platform in accordance with the present embodiment, advantageously enables support of the platform above a railway car with lateral clearance to facilitate movement of the car therebeneath, support of the apparatus on the railway car with minimum projection of the leg assemblies laterally outwardly of the car, and clamping interengagement between the apparatus and car. More particularly in this respect, in use of the apparatus as illustrated by the solid line disposition of the component parts in FIG. 26, leg assemblies 24 are in the elevated and retracted positions thereof in which the support and guide members 54 of the leg assemblies engage the laterally outer side of the bulb iron or top rail 28a of the corresponding side wall 28 of railway car 12. Such engagement laterally squeezes the car side walls toward one another, thus to clampingly interengage platform 22 and the railway car. Further in connection with the use disposition of the apparatus, leg member 56 of the leg assemblies are elevated from ground so as to position the upper ends of clamping members 232 on the leg members in engagement with the undersides of car rails 28a. Thus, clamping members 232 further enhance clamping interengagement between platform 22 and the railway car during use of the apparatus.

It should be noted at this point that the lateral width of gondola cars varies and that platform support plates 210, referred to hereinabove, enable the platform to rest on cars of different width and for the lateral clamping by the leg assemblies to be achieved in connection therewith. In this respect, it will be appreciated that the laterally opposite sides of the platform as defined by the ends of beams 36 and 38 determine the inner positions of the leg assemblies when the latter are in the retracted positions. If the width of the platform as defined by beams 36 and 38 were to correspond to the widest car dimension then, while the platform would rest on the side walls of a narrower car, guide and support members 54 of the leg assemblies might not laterally engage the top rails of the side walls of such a narrow car to achieve lateral clamping. Support plates 210 in effect provide extensions of the platform enabling the width thereof as defined by beams 36 and 38 to correspond to that of the narrowest car dimension, and enabling the lateral clamping in connection with such a narrow car. In connection with wider cars, such as is shown in FIG. 26, plates 210 rest on the top edges of the side walls of the car and enable lateral clamping in connection therewith as shown.

Figure 26:
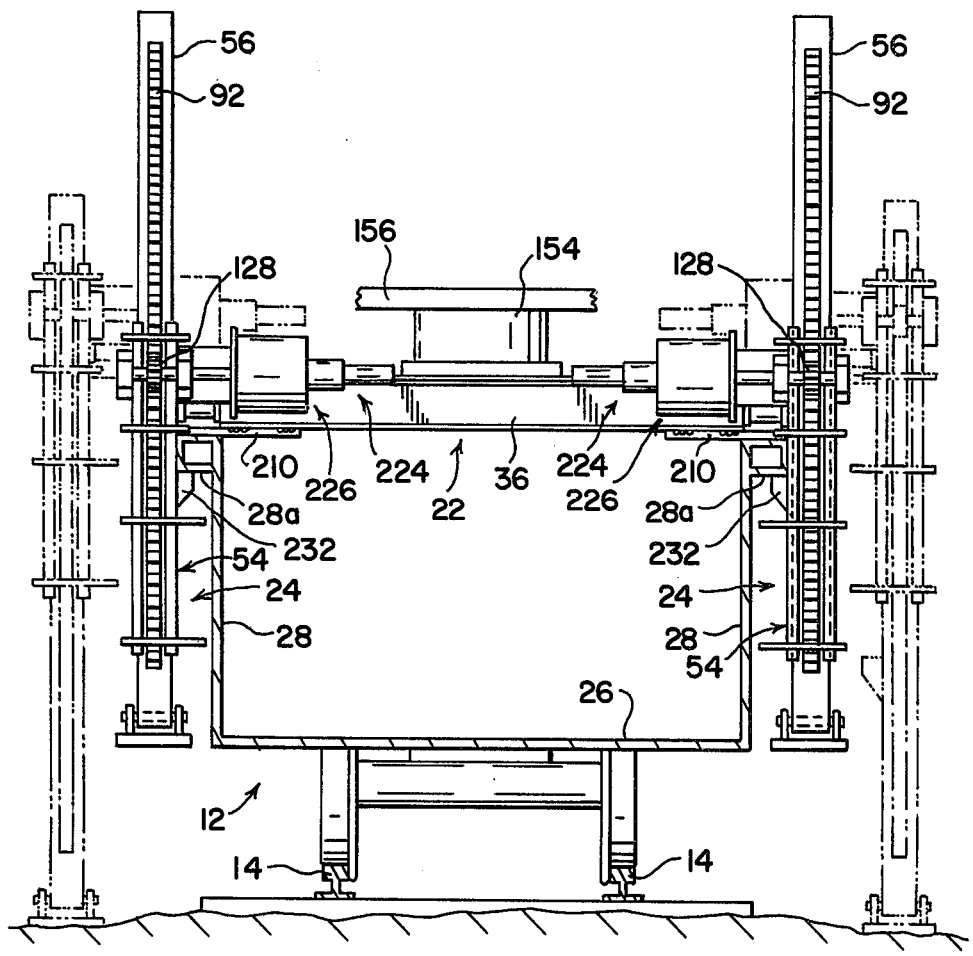
FIG. 26 is an end elevation view of the apparatus, partially in section, and showing the apparatus in the position of use in which the legs clampingly engage the sides of a railway car.

When car 12 or an adjacent car has been loaded or unloaded and it is desired to displace car 12 from beneath the apparatus, hydraulic motors 224 of the leg assemblies are actuated to achieve sufficient downward displacement of the corresponding leg member 56 for clamping members 232 to disengage the car side wall rails 28a without the lower ends of the leg members 56 engaging ground, and hydraulic piston and cylinder drive units 245 are then actuated to displace the corresponding leg assembly laterally outwardly to the broken line position illustrated in FIG. 26. Thereafter, hydraulic motors 224 are again actuated to lower leg members 56 for the lower ends thereof to engage ground, after which the platform is elevated above the car. When car 12 has been displaced from its position beneath the apparatus and another car is positioned therebeneath, the preceding procedure is reversed to again mount the apparatus on the underlying car for use in connection with the ensuing loading or unloading operation.

With regard to the extension, retraction, elevation and lowering capabilities with respect to the leg assemblies, the elevating capability enables displacement of the platform to an upward position in which the underside of the platform is spaced about nine feet above the railway tracks. The extension capability of the leg assemblies enables such platform elevation to be achieved with a lateral spacing of about fourteen feet between the inner sides of the leg assemblies on opposite sides of the railway track. Thus, considerable clearance is provided for the movement of a loaded or empty gondola car from or into position beneath the apparatus. The retraction capability with regard to the leg assemblies advantageously enables the apparatus to rest on the top edges of the side walls of a gondola car with a projection laterally outwardly of each side of about ten and one-half inches. The railroad industry imposes a limitation of thirteen inches with respect to the lateral projection of tie loading and unloading equipment when operationally positioned on a railway car, whereby it will be appreciated that the projection of ten and one-half inches is well within the imposed limitation. While arrangements other than those described hereinabove can be employed to achieve clamping interengagement between the platform and railway car, the lateral engagement of the guide and support members of the leg assemblies with the side walls, and the vertical engagement of the clamping members on the leg members with the undersides of the car side wall rails, enables achieving clamping by taking advantage of the positions of the component parts of the leg assemblies relative to the car walls when the leg assemblies are retracted. In any event, it will be appreciated that retraction of the leg assemblies relative to the platform serves the primary purpose of minimizing lateral projection, and that if the leg assemblies are utilized for clamping, the lateral and vertical clamping arrangements can be employed independently of one another as well as together.

To facilitate transportation of the apparatus such as on a flat bed car, leg assemblies 24 are supported for independent pivotal movement about the corresponding axis 52 by means of the corresponding bearing sleeve 48 and shaft 74 as mentioned herein above. Such pivotal movement provides for the leg assemblies to assume a horizontal disposition parallel to ends 34 of platform 22 to facilitate positioning of the apparatus on a flat bed car in the disposition illustrated in FIG. 14 of the drawing. The procedure for loading and unloading the apparatus relative to a flat bed car is the same as that described herein in connection with FIG. 14. In the present embodiment, as will be seen from FIGS. 17, 19, 20 and 22, each leg assembly is adapted to be pivoted about axis 52 by means of a corresponding drive unit 262 mounted on strap member 242 on the inner end of bearing sleeve 48. More particularly in this respect, drive unit 262 includes a hydraulic motor 264 fastened by means of bolts 266 to a mounting bracket assembly 268 which in turn is bolted or otherwise secured to a support plate 270 welded to strap member 242. A sprocket wheel 272 is mounted on the output shaft of motor 264 for rotation therewith and is drivingly connected to shaft 74 by means of a sprocket wheel 274 mounted on the end of shaft 74 and a sprocket chain 276 trained about sprocket wheels 272 and 274.

Sprocket wheel 274 can be attached to shaft 74 in any suitable manner, such as by providing the end of the tubular shaft with a plug welded thereto, not shown, and to which the sprocket wheel is attached by means of a plurality of bolts 278. It will be appreciated of course that motor 264 is connected to a source of hydraulic fluid under pressure through suitable controls to enable operation of the motor to rotate sprocket wheel 272 and thus sprocket wheel 274 in opposite directions, thus to pivot shaft 74 and the corresponding leg assembly 24 in opposite directions about axis 52. Such pivotal movement enables displacement of the leg assemblies between vertical and horizontal positions respectively perpendicular and parallel to platform 22.

In order to lock leg assemblies 24 in the vertical position so as to stabilize the apparatus during elevating and lowering of the platform, each of the bearing sleeves 48 is provided with a pair of locking plates 280 welded thereto adjacent plate portion 214 of mounting bracket 212 of the corresponding leg assembly. Each pair of locking plates 280 and the corresponding plate portion 214 are provided with aligned openings, not designated numerically, adapted to removably receive a locking pin component 282. It will be appreciated that the pin component, when inserted in the openings of the locking plates and mounting bracket plate, prevent pivotal movement of the corresponding leg assembly relative to bearing sleeve 48 and thus platform 22, and that such pivotal movement is enabled by removal of the pin.

In connection with pivoting leg assemblies 24 to the horizontal position to facilitate loading of the apparatus on a flat bed car, the latter car as mentioned hereinabove in connection with the description of FIG. 14, is provided with a turntable onto which the platform is lowered and which facilitates pivoting the apparatus horizontally to the transporting disposition thereof relative to the car. It will be appreciated that the turntable positions the platform above the bed of the car a distance sufficient to provide vertical clearance for hydraulic motors 224 and gear boxes 226 which are displaced with the leg assemblies and accordingly extend downwardly from support and guide members 54 when the leg assemblies are in the horizontal position.

While considerable emphasis has been placed herein on the structures of the preferred embodiments illustrated and described, it will be appreciated that many embodiments of the invention can be made and many changes made in the preferred embodiments without departing from the principles of the invention. In this respect, the raising and lowering capability of the legs relative to the platform can be achieved other than by rack and pinion mechanisms and, for example, could be achieved by hydraulically operated telescopically interengaged leg members. Likewise, support of the legs for lateral displacement and such displacement of the legs can be achieved by support arrangements and displacing mechanisms other than those illustrated and described. Further, while it is preferred to associate the leg assemblies with the platform for pivotal movement to horizontal positions parallel thereto, it will be appreciated that such is not necessary in connection with the elevating and lowering of the apparatus relative to an underlying railway car, the clamping engagement with the car, or operation of the apparatus in connection with the loading and unloading of a car. Moreover, while the leg assemblies are illustrated as being on opposite sides of the platform and pivotal about axes extending along the opposite sides, it will be appreciated that the legs could be mounted on the laterally extending ends of the platform adjacent the sides thereof and, if pivotally mounted thereon to pivot about axes extending along the end edges of the platform. Still further, while the apparatus is particularly useful in connection with the loading and unloading of railway ties, and a particular crane mechanism is disclosed which facilitates such use, it will be appreciated that the apparatus can be used for loading and unloading material or articles other than railway ties, that the grapple assembly herein described can be replaced by other grapple arrangements, clamp shell devices, magnet heads or the like depending on the material to be handled, and that the crane can have a single boom or a multiple boom assembly other than that described herein.

The foregoing and other modifications of the preferred embodiments, as well as other embodiments of the present invention, will be suggested or obvious from the present disclosure, whereby it is to be distinctly understood that the foregoing descriptive matter is to be interpreted merely as illustrative of the present invention and not as a limitation.

Having thus described the invention, it is claimed:

1. Article loading and unloading apparatus for use with a railway car on ground supported railway means, said car having laterally opposite side wall means, said apparatus including horizontal platform means, said platform means having opposite sides corresponding to said opposite side wall means of said railway car, crane means on said platform means, leg means spaced apart in the direction between said opposite sides of said platform means and having vertical positions relative to said platform means, said leg means including leg member means and leg member support means, means mounting said leg member support means on said platform means, said leg member support means in said vertical positions of said leg means supporting said leg member means for displacement between raised and lowered positions relative to said platform means, means to displace said leg member means between said raised and lowered positions, said leg member means in the lowered positions thereof engaging ground and supporting said platform means above said railway car for said car to be movable along said railway means beneath said platform means, said platform means in the raised positions of said leg member means being supported on said side wall means of said railway car, said mounting means including means supporting said leg means for horizontal displacement between laterally extended and retracted positions relative to the corresponding side of said platform means when said leg means are in said vertical positions and said leg member means are in the raised positions thereof, and means to displace said leg means between said extended and retracted positions, said leg means including means engaging said opposite side wall means of said railway car when said leg means are in the retracted positions thereof to clampingly interengage said platform means and railway car.

2. Apparatus according to claim 1, and means displaceable with said leg member means between said raised and lowered positions thereof and engaging said opposite side wall means of said railway car when said leg means are in the retracted positions to clampingly interengage said platform means and railway car.

3. Apparatus according to claim 2, wherein said side wall means include side walls having rail means along the upper edges thereof and said means displaceable with said leg member means includes clamping member means engaging under said rail means when said leg member means is in the raised position thereof.

4. Apparatus according to claim 1, wherein said mounting means further includes means supporting said leg means on said platform means for pivotal movement about horizontal axes from said vertical positions to horizontal positions relative to said platform means, and means to pivot said leg means about said horizontal axes.

5. Apparatus according to claim 1, wherein said means supporting said leg means for horizontal displacement includes arm means carrying said leg member support means, and means on said platform means slidably supporting said arm means for displacement outwardly and inwardly of said corresponding side of said platform means.

6. Apparatus according to claim 5, wherein said means slidably supporting said arm means includes sleeve means on said platform means, said arm means including arm member means slidably received in said sleeve means.

7. Apparatus according to claim 6, wherein said arm means includes means supporting said leg member support means for pivotal movement about horizontal axes between vertical and horizontal positions relative to said platform means.

8. Apparatus according to claim 7, wherein said means to displace said leg member means between said raised and lowered positions includes means mounted on said leg member support means.

9. Apparatus according to claim 7, wherein said leg member means include rack means, and said means for displacing said leg member means between said raised and lowered positions includes pinion means interengaged with said rack means and means for rotating said pinion means in opposite directions.

10. Apparatus according to claim 9, wherein said side wall means include side walls having rail means along the upper edges thereof, and clamping member means displaceable with said leg member means and engaging under said rail means when said leg means are in the retracted positions and said leg member means are in the raised positions.

11. Apparatus according to claim 1, wherein said platform means has opposite ends transverse to said opposite sides thereof, said platform sides and ends providing said platform means with four corners, and said leg means including a leg member and a corresponding leg member support component adjacent each of said corners.

12. Apparatus according to claim 11, wherein said means supporting said leg means for horizontal displacement between extended and retracted positions includes arm means individually supporting each of said leg member support components for such displacement independent of the others of said components, and said means to displace said leg means between said extended and retracted positions includes individual drive means for each said arm means.

13. Apparatus according to claim 12, wherein each said leg member support component is outwardly adjacent the corresponding end of said platform means, said mounting means further including means supporting said leg member support components for pivotal movement about horizontal axes parallel to said platform sides to position said leg means between vertical positions and horizontal positions, said leg members in said horizontal positions of said leg means extending along the corresponding platform end, and means to pivot said leg member support components about said horizontal axes.

14. Apparatus according to claim 12, wherein each said arm means includes bearing sleeve means extending along the corresponding side of said platform means and shaft means pivotally supported in said bearing sleeve means and having an outer end adjacent the corresponding end of said platform means, the corresponding leg member support component being attached to said outer end of said shaft means, said bearing sleeve means having opposite ends, arm member means intermediate said opposite ends of said bearing sleeve means, and arm member support means on said platform means slidably supporting said arm member means to support said bearing sleeve means and shaft means for displacement outwardly and inwardly to said corresponding side of said platform means.

15. Apparatus according to claim 14, wherein each said leg member includes rack means, said means for displacing said leg member means between said raised and lowered positions including pinion means for each said leg member interengaged with the corresponding rack means, and drive means for each said pinion means, said pinion means and drive means being mounted on the corresponding leg member support component for each said leg member.

16. Article loading and unloading apparatus for use with a railway car on ground supported railway means, said car having opposite sides, said apparatus including platform means, said platform means having opposite sides corresponding to said opposite sides of said railway car and opposite ends transverse to said sides, crane means on said platform means, leg means on said platform means spaced apart in the direction between said opposite sides thereof, first sleeve means slidably supporting said leg means on said platform means for displacement between raised and lowered positions relative thereto, second sleeve means mounted on said opposite sides of said platform means and having horizontal axes extending in the direction between said opposite ends of said platform means, shaft means pivotally supported by said second sleeve means and having an end attached to said first sleeve means, said shaft means and second sleeve means supporting said first sleeve means and leg means on said platform means for pivotal movement about said horizontal axes for displacing said leg means between depending and horizontal positions relative to said platform means, said leg means in said horizontal positions being above said platform means, first drive means on said first sleeve means to displace said leg means between said raised and lowered positions, said platform means in the raised positions of said leg means being supported on a railway car therebeneath, said leg means in the lowered positions thereof engaging ground and supporting said platform means above said railway car for said car to be movable along said railway means beneath said platform means, and second drive means to pivot said said shaft means and thus said first sleeve means about said horizontal axes when said leg means are in said raised position.

17. Apparatus according to claim 16, and means to clampingly interengage said platform means and railway car when said platform means is supported thereon.

18. Apparatus according to claim 16, wherein said leg means have lower ends, said lower ends including pad means engaging ground when said leg means are in the lowered positions thereof.

19. Apparatus according to claim 16, wherein said leg means include rack means, and said means for displacing said leg means includes pinion means interengaged with said rack means and means for rotating said pinion means in opposite directions.

20. Apparatus according to claim 19, wherein said pinion means is rotatably supported on said sleeve means.

21. Apparatus according to claim 16, wherein said crane means includes boom means and article gripping jaw members each pivotal about a jaw axis, means mounting said jaw members on said boom means for pivotal movement about a first axis perpendicular to said jaw axis and for pivotal movement about a second axis perpendicular to said first axis and said jaw axis, and means to pivot said jaw members about said jaw, first and second axes.

* * * * *